US007149946B2

(12) United States Patent
Peretz et al.

(10) Patent No.: US 7,149,946 B2
(45) Date of Patent: Dec. 12, 2006

(54) SYSTEMS AND METHODS FOR ENHANCED STORED DATA VERIFICATION UTILIZING PAGEABLE POOL MEMORY

(75) Inventors: Ervin Peretz, Redmond, WA (US); Karan Mehra, Redmond, WA (US); Landy Wang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 586 days.

(21) Appl. No.: 10/461,136

(22) Filed: Jun. 13, 2003

(65) Prior Publication Data
US 2004/0255210 A1 Dec. 16, 2004

(51) Int. Cl.
*H03M 13/00* (2006.01)
*G06F 11/10* (2006.01)
(52) U.S. Cl. ...................... 714/758; 714/807
(58) Field of Classification Search ............... 714/807, 714/758
See application file for complete search history.

(56) References Cited

U.S. PATENT DOCUMENTS

| | | | |
|---|---|---|---|
| 5,379,342 A | 1/1995 | Arnold et al. | |
| 6,003,151 A * | 12/1999 | Chuang | 714/752 |
| 6,038,676 A | 3/2000 | Yanes et al. | |
| 6,438,724 B1 | 8/2002 | Cox et al. | |
| 6,446,234 B1 | 9/2002 | Cox et al. | |
| 6,964,008 B1 * | 11/2005 | Van Meter, III | 714/807 |

OTHER PUBLICATIONS

David C. Feldmeier. Fast Software Implementation of Error Detection Codes. IEEE/ACM Transactions on Networking, vol. 3 Issue 6, pp. 640-651, 1995.
Seongwoo Kim and Arun K. Somani. Area Efficient Architectures for Information Integrity in Cache Memories. Proceedings of the 26th annual International Symposium on Computer Architecture, 1999, pp. 246-255.

* cited by examiner

*Primary Examiner*—Shelly Chase
(74) *Attorney, Agent, or Firm*—Amin & Turocy, LLP

(57) ABSTRACT

The present invention utilizes pageable pool memory to provide, via a data verifier component, data verification information for storage mediums. By allowing the utilization of pageable pool memory, overflow from the pageable pool memory is paged and stored in a virtual memory space on a storage medium. Recently accessed verification information is stored in non-pageable memory, permitting low latency access. One instance of the present invention synchronously verifies data when verification information is accessible in physical system memory while deferring processing of data verification when verification information is stored in paged memory. Another instance of the present invention allows access to paged verification information in order to permit synchronous verification of data.

39 Claims, 19 Drawing Sheets

SYSTEMS AND METHODS FOR ENHANCED STORED DATA VERIFICATION UTILIZING PAGEABLE POOL MEMORY

TECHNICAL FIELD

The present invention relates generally to data verification and more particularly to apparatus, systems and methods for enhanced stored data verification utilizing pageable pool memory.

BACKGROUND OF THE INVENTION

Computers have become an integral part of society. Every day people become more dependent on this technology to facilitate both work and also leisure activities. It is especially useful in areas that require repetitive accuracy, such as safety related tasks. In these types of undertakings, computing systems handle critical tasks such as controlling nuclear power, controlling air traffic, and aiding in medical procedures and health care. Computers are even used for safety to control automobile traffic via stop light systems. Thus, while computing system speeds are important, so is their ability to accurately relay information. For critical systems, it becomes readily apparent what can happen if the corrupted information is utilized in a critical task. In these circumstances, people's lives depend on the predictability and accuracy of the information.

When information is unchanged from its original form and has not been accidentally or intentionally altered, it is considered to have "integrity." Therefore, maintaining information or data in exactly the same form as the original is referred to as "data integrity." Integrity of data is also important in non-critical tasks as well. For example, consider the major problems that altered data would cause in a banking transaction where a few extra 'zeroes' are inadvertently added to a wire funds transfer, in a company distribution scheme where a customer receives a bulldozer instead of a shovel, and in a national government information institute that retrieves an incorrect populous count and erroneously limits representation to a voting district. These instances may not be life threatening, but they do show how lack of data integrity can create serious problems. In a computing system, data integrity should be maintained at all times regardless of how many computing operations have handled the data or how many times the data has been transferred and stored.

A typical computing system has a processor and some means to store information such as a hard drive, floppy disk, CD-ROM (compact disc—read only memory), and/or random access memory (RAM) and the like. Whether the medium of the storage device is magnetic, electrical, and/or optical, the storage ultimately consists of a means to represent "ones" and "zeroes" or "digital data." When this digital data is sequenced in a particular order, it represents "information." Computing systems utilize this information for a multitude of tasks including processing, calculating, transferring, and displaying. Sometimes information is utilized quite frequently and at other times information is rarely utilized, but it may still have great value and, therefore, must be accurately maintained. Thus, most storage devices must allow frequent access to data while also maintaining some level of permanency for data rarely updated. Since it is common for data to be required frequently while a computing process is occurring, the speed at which the data can be accessed can be as equally important as the speed of the processor in the computing system. A fast processor with a slow data access device may not necessarily yield a fast overall computing system.

Obviously, if a computing system is extremely fast with fantastic data access retrieval and storage rates, but data integrity is not maintained, the utility of that computing system is drastically reduced. So, even though seeking performance boosts is essential in maintaining a competitive computing system, data integrity cannot be overlooked in the process. Generally, when digital data is transferred at a bit level, a bit with a value of "1" or "0" is copied or moved to a storage medium where it is stored as a "1" or "0." Often, a "1" is referred to as a "high" state and a "0" is referred to as a "low" state. This is typically in reference to the process of utilizing a higher voltage levels (usually 5 volts) to represent a "1" and a lower voltage levels to represent a "0"(usually zero volts). So what is actually transferred, in some cases, is a "state" or voltage level. Thus, if a 5 volt signal being transferred over a wire attenuates below a certain threshold value during the transfer, it might be interpreted at the receiving end as a "0" or a low state. Even though the source had actually transmitted a high state, the receiver stored it as a low state. In this example, data integrity has not been maintained. Another example could include an attempt to store a high state value on a magnetic media that has a physical defect and the intended high state appears as a low state when read at a later time. Data can also lose integrity even after it has been correctly stored on a storage medium. An example of this would be a magnetic floppy disk with correctly stored data being introduced near a strong magnetic field that inadvertently alters the state values stored on the floppy. Yet another example would be a CD-ROM disk that has a dill speck that blocks a laser from correctly identifying a state value. Thus, ensuring data integrity is important no matter what the type of medium or the inherent value of the data. Even a simple task of keeping time for a clock on a computer monitor can become corrupted if data integrity is not ensured.

Since, as illustrated supra, data integrity is paramount in a computing system, several methods have been developed to facilitate this aspect of data. One of the simplest forms of checking data integrity is utilizing a method called "checksums." The 1's and 0's mentioned supra are sequenced to form "bytes" of data. Each 1 or 0 is referred to as a "bit." Each byte typically contains 8 bits. Two bytes generally form a "word" which has 16 bits. Checksums represent the number of bits, bytes, words, and/or larger groupings (e.g., "blocks") and are sent along with data or stored in relation to the data for later retrieval (such as for a "read" command). On the receiving end, the checksum is computed based on the data received and compared with the value that was sent with the data. If the two numbers match, the data is considered correct. Thus, if a set of 8 bytes is sent and 8 bytes are received, the data integrity is assumed to be maintained. One of the disadvantages of this type of integrity check is that corruption of data within the set of bytes can occur and the checksums can still match.

Although checksums improve the integrity somewhat, they are not a 100% guarantee of data integrity. Because of this, other methods have been conceived such as cyclic redundancy check (CRC) polynomial methods. A CRC polynomial is applied to the data to establish a check value that is sent along with the data. The receiving end applies the same polynomial to the data and compares its result with the result appended by the sender. If they agree, the data is considered correct. The CRC method allows a greater degree of ensuring data integrity over checksums alone with a minimal overhead performance hit due to the processing of the CRC values for the data. Even more methods and varying degrees of methods can be utilized to facilitate data integrity. Due to the importance of this aspect of data as described above, this is a field that continues to be expanded as technology progresses.

It is conceivable that as the data integrity checking methods become more robust, they can also require more processing power to execute and more storage space to maintain integrity related data for future checks, such as for reading and checking data at a later time. Advances in computing processor technology are constantly increasing processor speeds, facilitating the processing of data integrity checks. However, speeding up a processor does not aid with the storage of data relating to the data integrity checks. Typically, data integrity checks are required to be done "on-the-fly" or synchronously with a read or write task executed by a computing platform. This is generally due to the fact that data is checked before it is used or stored to help prevent corrupt data from being utilized to further corrupt more data. And, as noted supra, the speed at which a computing system can access data is a contributing factor to its overall performance. Thus, data integrity checks need to be fast in order to not impede data access speeds. Thus, it is common for data integrity information, or verification information, to be stored in quickly accessible memory such as system RAM and the like.

As with every aspect of computing technology, storage medium sizes are becoming increasingly larger. Like processor speeds that used to double every two years and now double every six months, storage media has become exponentially larger and yet cheaper to produce. This brings great benefits as society thrives to digitize and store more data each year than the previous year. Even non-business consumers are demanding these large storage devices for home use. Where 1, 2 or even 6 gigabyte hard drives were considered, at one time, to be too large to be filled by a typical user, they were surpassed with 10, 20 and even 30 gigabyte drives in a short time. And, today, 100 and even 200 gigabyte hard drives are becoming the standards, even for home computing systems. Thus, data integrity information that used to be considered inconsequential in size is now becoming consequential due to the extreme sizes of storage media. It stands to reason that both storage sizes and data integrity information related to a computing system will continue to grow beyond even what is conceivable by today's expanded standards. And their impact on a computing system's overall performance will continue to increase.

SUMMARY OF THE INVENTION

The following presents a simplified summary of the invention in order to provide a basic understanding of some aspects of the invention. This summary is not an extensive overview of the invention. It is not intended to identify key/critical elements of the invention nor to delineate the scope of the invention. Its sole purpose is to present some concepts of the invention in a simplified form as a prelude to the more detailed description that is presented later.

The present invention relates generally to data verification and more particularly to systems and methods for enhanced stored data verification utilizing pageable pool memory. Pageable pool memory is leveraged via a data verifier component to provide data verification information for extremely large storage mediums. By allowing the utilization of pageable pool memory, the data verifier component allows much larger storage mediums to be verified without substantially degrading the performance of a computing system operatively connected to the storage medium, expanding the computing system's data storage capabilities while ensuring data integrity. The present invention permits overflow from the pageable pool memory to be paged and stored in a virtual memory space on the storage medium, thus, increasing data verification information capacity without utilizing substantial physical memory assets. Recently accessed verification information is stored in non-pageable memory, permitting low latency access, reducing storage access time and increasing computing performance.

The present invention also facilitates computing system usage by allowing storage medium sizes to be verified that were previously unverifiable. This removes limits inherent in increasing storage medium sizes due to limited physical system memory. Current data verification schemes require up to and beyond 100% of a computing system's memory to properly verify large storage mediums. Obviously, when more than 100% of the available system memory is required, data is not verified, possibly allowing corrupt data to permeate the computing system if it is utilized. The overflow capability of the present invention permits almost unlimited expandability of the verification information and, thus, almost unlimited expandability of the size of the storage medium while maintaining data integrity. This is accomplished, in one instance of the present invention, by synchronously verifying data when verification information is accessible in physical system memory while deferring processing of data verification when verification information is stored in paged memory. In another instance of the present invention, this is accomplished by accessing paged verification information from a storage medium synchronously with a read and/or write. This flexibility drastically improves the data volume capability of a computing system, and, at the same time enables a computing system to remove physical system memory as a limitation to utilizing massive storage mediums, permitting substantially unbounded storage growth while maintaining data access speeds and system computing performance.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
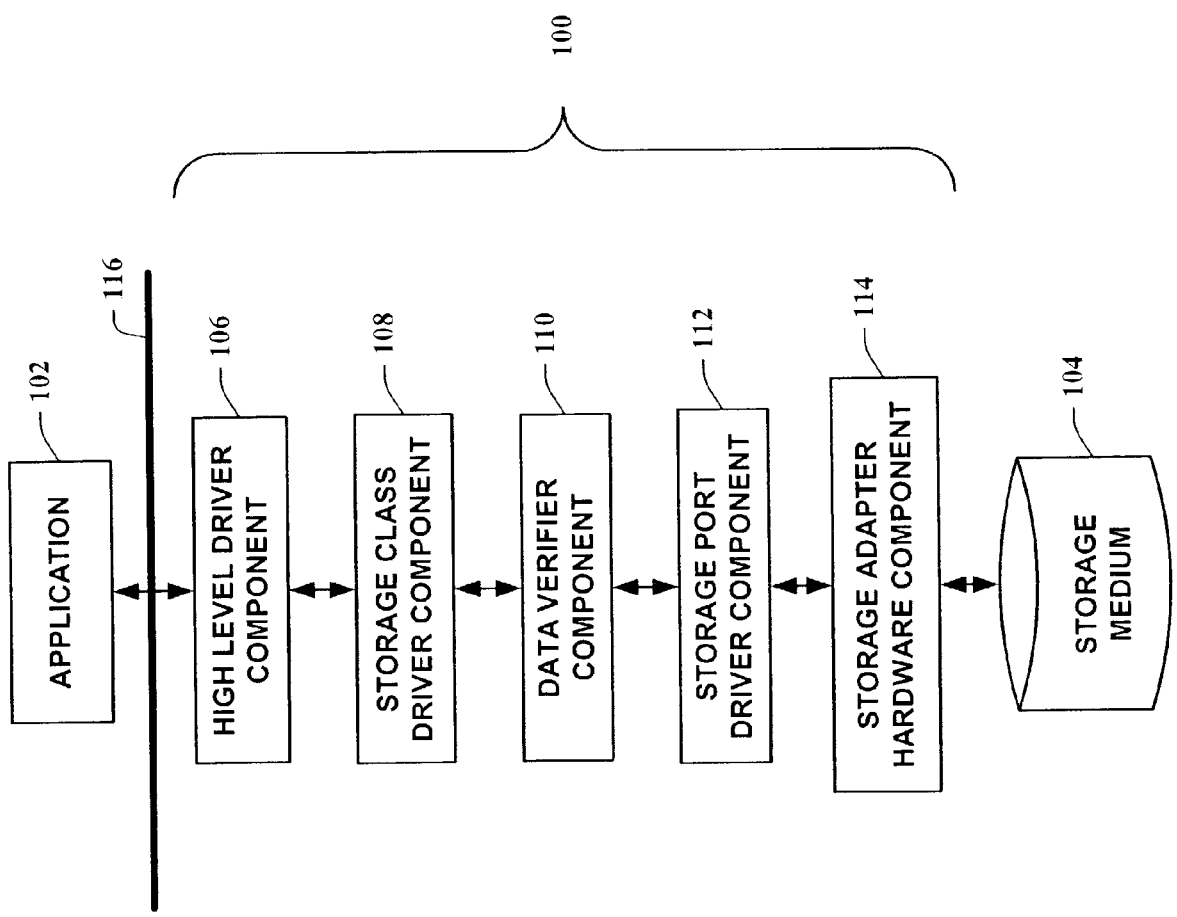
FIG. 1 is a block diagram of a storage medium driver stack in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers. A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

The present invention provides a mechanism to allow a theoretically infinite expansion means for storing and utilizing verification information related to data stored on a storage medium. This is accomplished by allowing verification information, such as checksum arrays, to be stored not only in a computing system's non-pageable RAM, but also in pageable pool memory. This allows for overflow verification information to be paged to a virtual memory space, alleviating the limitation imposed by the amount of physical system memory. In other instances of the present invention, redundancy features are included to permit copying the paged overflow verification information into disparate sections of the virtual memory space to protect integrity of the verification information.

In some computing operating systems, a driver verifier is included which also contains a disk verification function. The driver verifier works by installing a filter driver low in the disk driver stack to checksum disk blocks as they are written and read. Traditionally, this filter driver only uses non-pageable pool memory. This severely limits the amount of disk space that can be checksummed because the checksums themselves consume roughly 1% of the disk space verified in physical memory. So, for example, for a 100 gigabyte disk, the filter would attempt to allocate more physical memory than is usually available for the entire system. This means that a traditional disk verification function can not actually verify the entire disk and consumes so much memory that a computing system is unusable.

To overcome this limitation, the present invention allows an overflow of the checksum arrays into pageable pool) memory. However, this also means that the disk being verified may contain the pagefile of the overflow checksums which is a backing store for the pageable pool memory. Thus, the present invention allows redundant copies of the pagefile to be stored in disparate locations in a storage medium to preserve its integrity. The present invention also enables a disk verifier to actually verify the entire disk in a typical configuration and additionally allows the computing system to run for extended periods of time until a disk error is detected.

In other instances of the present invention, a data verifier component, such as a disk verifier and the like, tracks locations of verification information paged into a virtual memory space. In this manner, the data verifier component can directly access the verification information from the virtual memory space on a storage medium. Thus, a memory manager is not required to retrieve paged verification information before the data verifier component can complete its integrity check of a read and/or a write. This also eliminates the need to have a deferred task list to track verification checks when data is unavailable from a system's physical memory, simplifying data verification. In a typical example of this instance of the present invention, a locked file is created on a storage medium and its location along with its sector layout is tracked by a data verifier component. Whenever desired verification information is not found in physical memory, a block type read is performed to retrieve the desired verification information from the locked file. Thus, the data verifier component acts as its own memory manager in this example. This allows all verification checks to be completed "on-the-fly" or synchronously rather than utilizing a deferment means to allow retroactive verification.

In FIG. 1, a block diagram of a storage medium driver stack 100 in accordance with an aspect of the present invention is illustrated. The storage medium driver stack 100 interfaces with an application 102 and a storage medium 104. A user-kernel boundary 116 typically exists between the application 102 and the storage medium driver stack 100. The storage medium driver stack 100 is comprised of a high level driver component 106, a storage class driver component 108, a data verifier component 110, a storage port driver component 112, and a storage adapter hardware component 114. The storage adapter hardware component 114 accounts for various types of specific hardware types such as small computer system interfaces (SCSI) and other hardware standard interfaces and the like. The storage port driver component 112 defines an interface to storage class drivers such as hard disk, tape, CD-ROM drives, DVD (digital video disc), and changer class drivers and the like. This component 112 insulates class drivers from adapter-specific requirements of a host bus adapter that different devices utilize for connection purposes. It 112 also synchronizes access to buses for drivers of devices. Typically, an operating system supplies storage port driver components for SCSI, IDE (Intelligent Drive Electronics), USB (Universal Serial Bus), and IEEE (Institute of Electrical & Electronics Engineers) 1394 adapters and the like.

The high level driver component 106 is generally comprised of a high level driver filter that intercepts traffic from applications and lower driver stack components and modifies the traffic before passing them on. This component 106 can also be utilized to track the performance of underlying hardware. The storage class driver component 108 utilizes a port/class interface to control a device of its type on any bus for which a system provides a storage port driver. The component 108 is specific to a particular class of device such as a CD-ROM class driver or a disk device class driver or the like. The storage class driver component 108 handles input/output (I/O) requests from applications or lower stack drivers and is transparent to high level driver components. The data verifier component 110 is a low level driver component that supports device-specific functionality not provided by a system's storage class driver component. In the present invention, the data verifier component 110 is utilized to check data integrity of data stored on the underlying storage medium 104.

Figure 2:
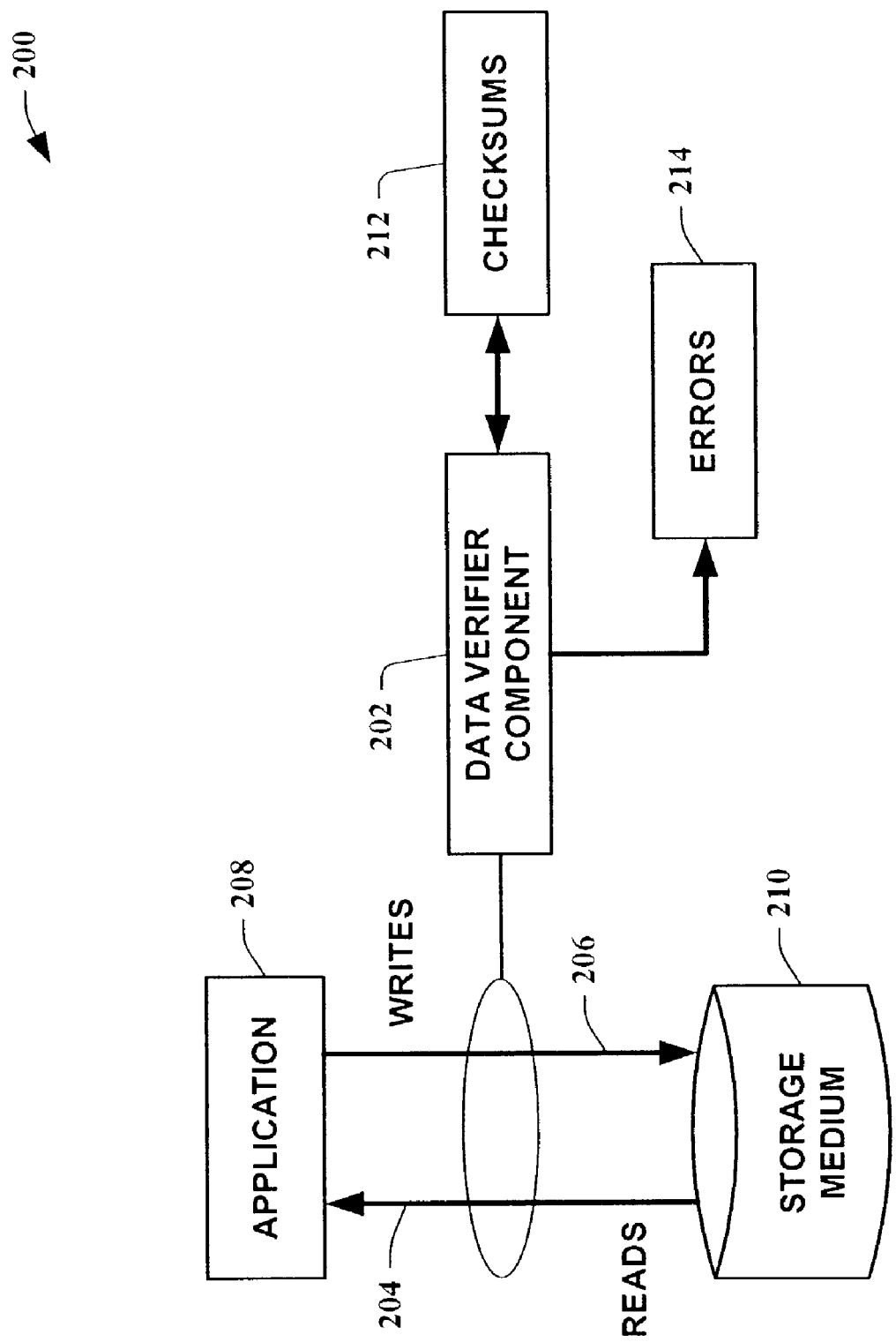
FIG. 2 is a block diagram of a data verification system in accordance with an aspect of the present invention.

Turning to FIG. 2, a block diagram of a data verification system 200 in accordance with an aspect of the present invention is shown. The data verification system 200 is comprised of a data verifier component 202 which intercepts data from reads 204 and writes 206 between an application 208 and a storage medium 210. The data verifier component 202 checks the data's integrity by utilizing verification information 212 such as checksums and the like stored in a computing system. If a particular piece of data does not match its verification information, the data verifier component 202 outputs an error 214 such as an error report and/or bug check and the like. In one instance of the present invention, the error 214 includes, but is not limited to, information such as a pointer to an IRP (Input/Output Request Packet) making the associated read or write request, the device object of a lower device, the number of the sector in which the error was detected, and the cause of the error and the like.

Figure 3:
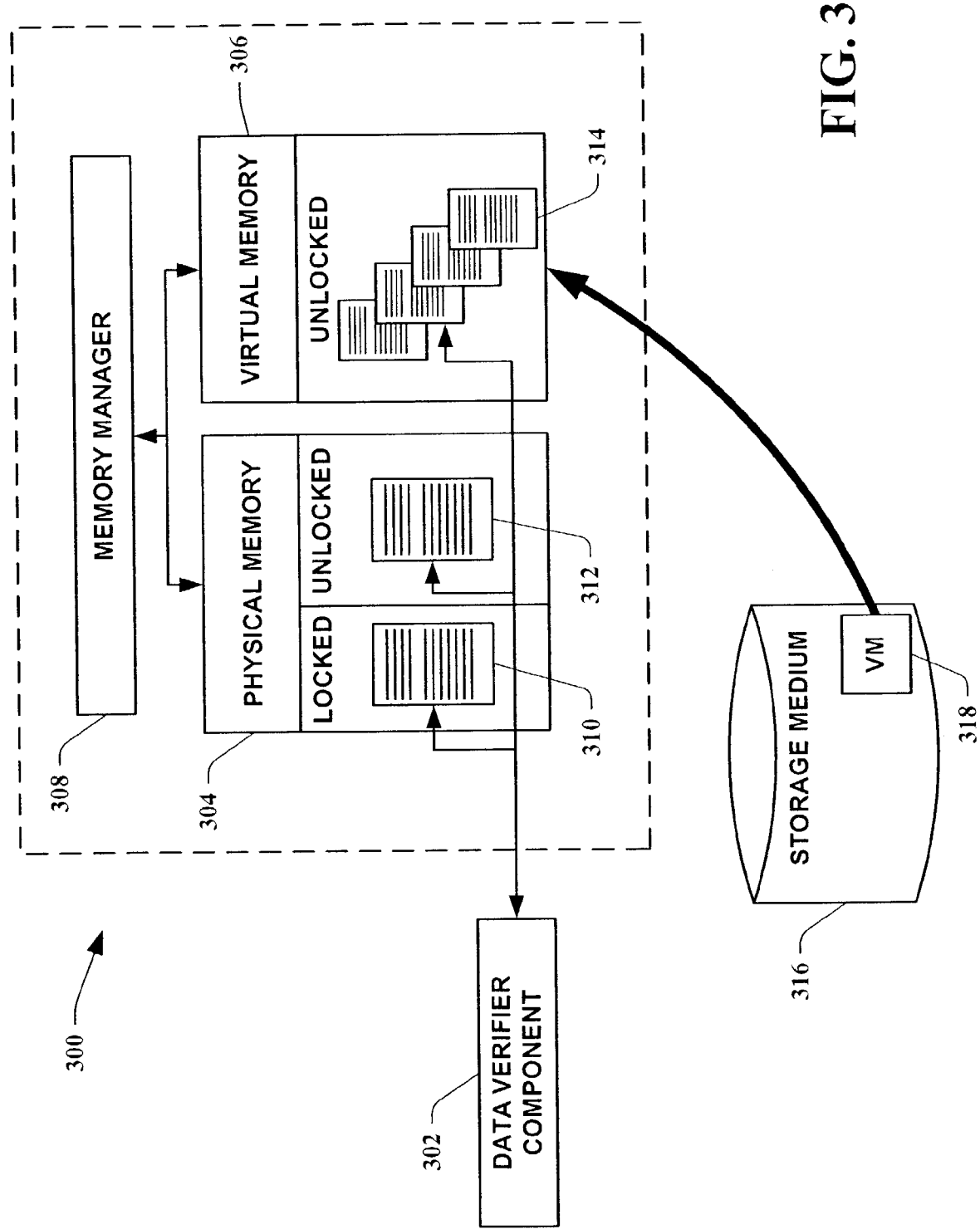
FIG. 3 is a block diagram of a memory utilization structure for a data verification system in accordance with an aspect of the present invention.

Moving on to FIG. 3, a block diagram of a memory utilization structure 300 for a data verification system in accordance with an aspect of the present invention is illustrated. The memory utilization structure 300 is employed by a data verifier component 302 to accomplish verification of data on a storage medium 316. The structure 300 is comprised of a physical memory portion 304, a virtual memory portion 306, and a memory manager 308. The physical memory portion 304 is comprised of non-pageable memory (i.e., "locked" memory) 310 and pageable pool memory (i.e., "unlocked" memory) 312. The virtual memory portion 306 is comprised of paged memory 314 that is "unlocked" memory. The virtual memory portion 306 is not physical memory and is actually a virtual memory space 318 set aside by a computing system on a portion of the storage medium 316.

In one instance of the present invention, verification information about data on a storage medium is stored in memory based on recent accesses. A predetermined amount of memory in the non-pageable memory 310 of the physical memory portion 304 is utilized to store the most recent accessed verification information. Verification information not meeting this criterion is moved into the pageable pool memory 312 of the physical memory portion 304. When the pageable pool in memory 312 is full, the memory manager 308 pages any-overflow verification information and stores a pagefile in the virtual memory space 318.

In an example of one instance of the present invention, a data verifier component utilizes pageable pool memory to store the overflow of checksum arrays. Each checksum array is a sequence of 2-byte checksums, each representing a CRC checksum of the data contained in a (typically) 512-byte disk block. The most-recently-accessed 4 megabytes of checksum arrays (representing checksums for the most-recently-accessed 500 megabytes of disk blocks) are kept in non-pageable (i.e., locked) memory for immediate access. The remaining checksum arrays are unlocked and consequently are part of a pageable pool that can be paged out to an on-disk pagefile by a memory manager.

Figure 4:
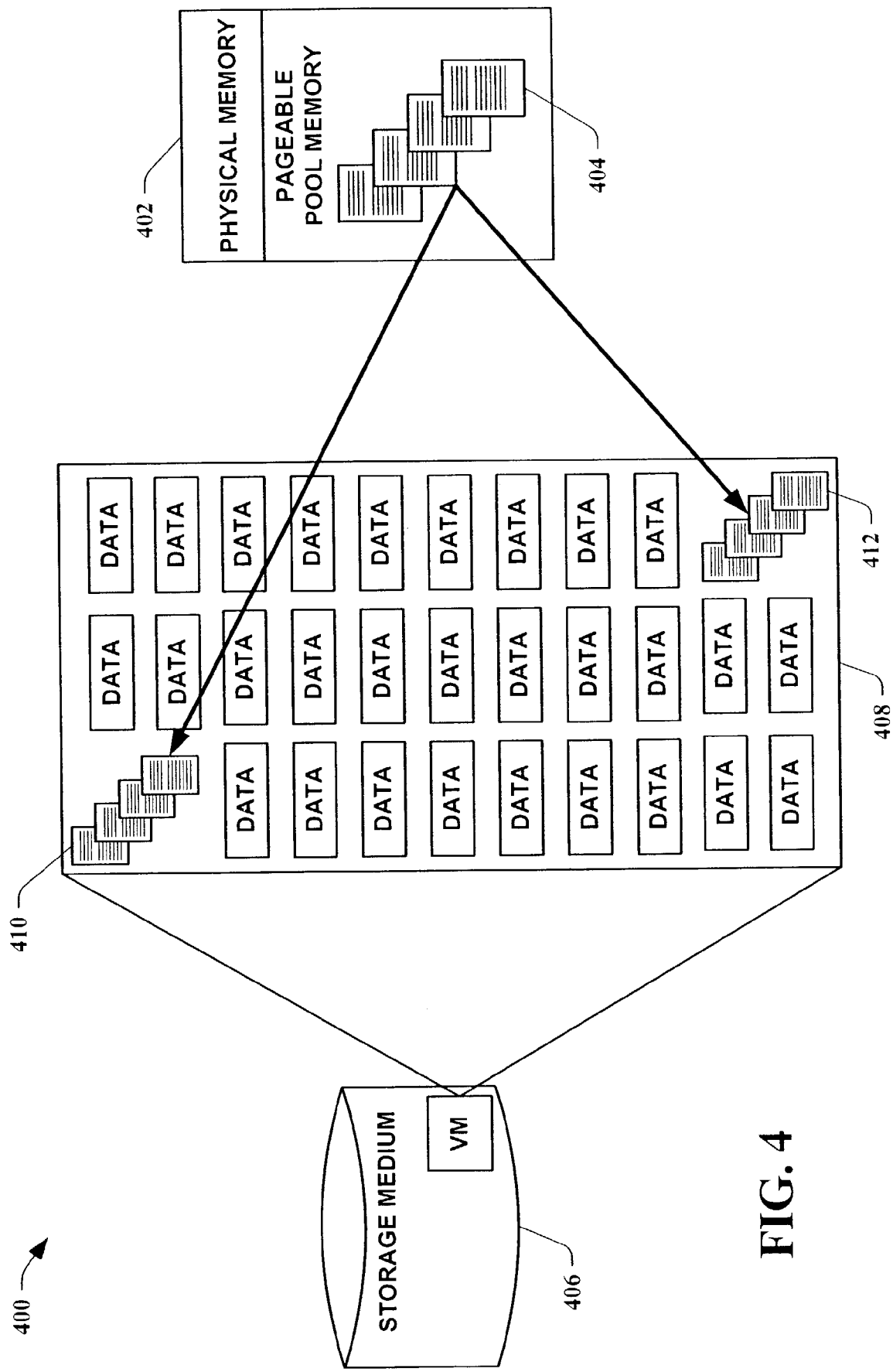
FIG. 4 is a block diagram of pageable pool memory storage for a data verification system in accordance with an aspect of the present invention.

Since overflow verification information is paged and stored on a virtual memory space on a storage medium, it is subject to the same risk of data corruption as data it is used to verify. In FIG. 4, a block diagram of pageable pool memory storage 400 for a data verification system in accordance with an aspect of the present invention is depicted. When verification information in pageable pool memory 404 of physical system memory 402 overflows, it is paged into a pagefile and stored on a storage medium 406 in a virtual memory space 408 of a storage medium 406. Storing a single copy of the paged overflow verification information cannot guarantee its own integrity. To overcome this, the present invention stores at least two redundant copies 410, 412 of the paged verification information in disparate sections of the virtual memory space 408. This allows a data verifier component to compare data from both copies 410, 412 before employing the paged verification information in verification of data being read and/or written to a storage medium.

As an example of the above, in one instance of the present invention, checksum arrays are allowed to be paged to a storage medium. For redundancy, therefore, a data verifier component stores at least two copies of each checksum array in distant parts of a virtual memory space. If paged out, the copies of a checksum array are, therefore, in different data blocks and are not read by the same data access. When the data verifier component compares a computed checksum against a stored checksum, it first compares the two copies of the stored checksum against each other. If a mismatch occurs, the data verifier component triggers an error.

Figure 5:
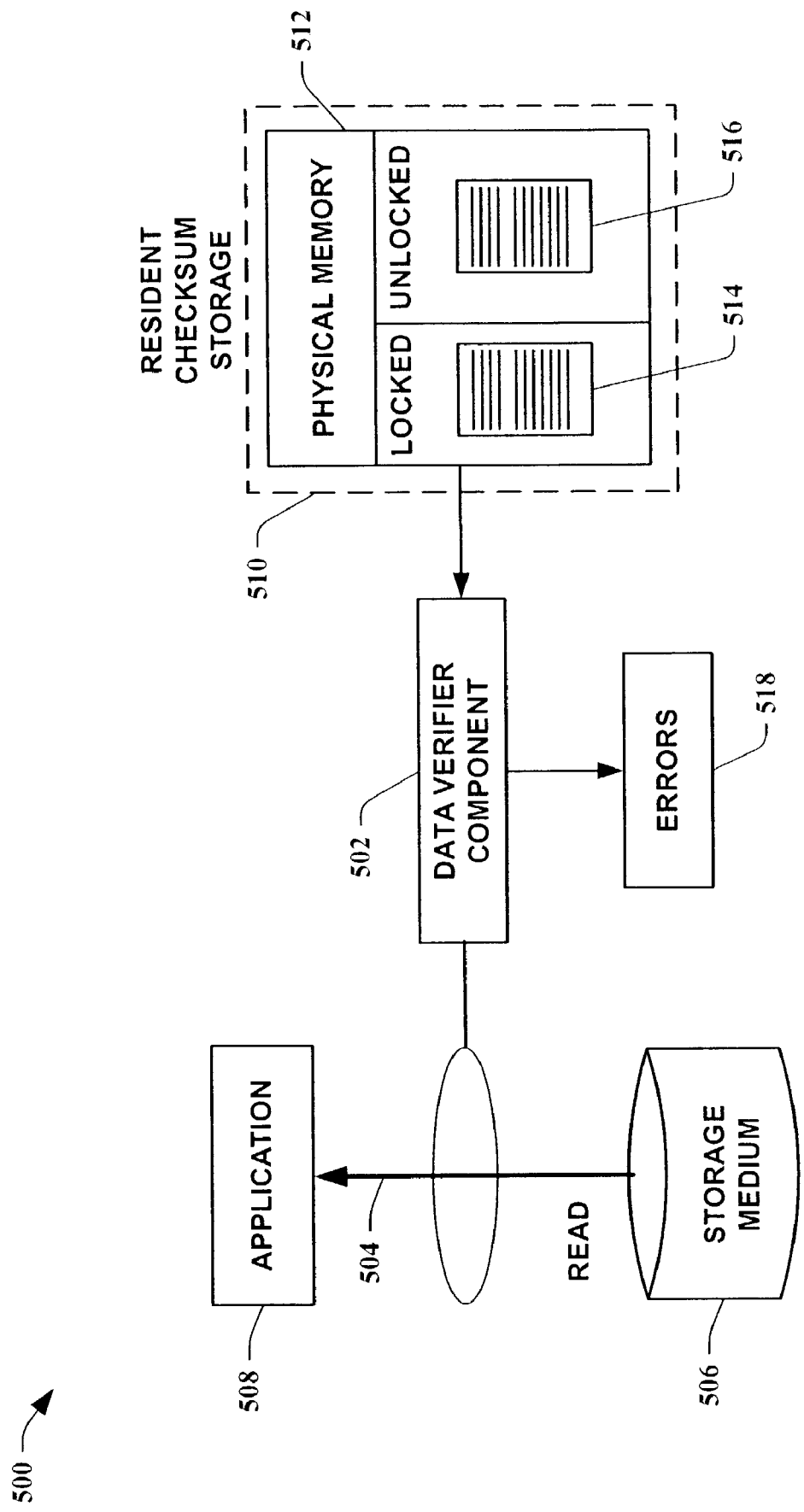
FIG. 5 is a block diagram of a data verification system with regard to a data read in accordance with an aspect of the present invention.

Referring to FIG. 5, a block diagram of a data verification system 500 with regard to a data read in accordance with an aspect of the present invention is illustrated. The data verification system 500 is comprised of a data verifier component 502 which intercepts data during a read 504 between an application 508 and a storage medium 506. The data verifier component 502 checks the data's integrity by utilizing "resident" verification information 510 such as checksums and the like stored in a system's physical memory 512. The resident verification information 510 is comprised of data stored in non-pageable memory 514 and/or pageable pool memory 516 residing on the system's physical memory 512. If computed verification information relating to the data from the read 504 does not match its verification information stored in the resident verification information 510, the data verifier component 502 outputs an error 518 such as an error report and/or bug check and the like.

For example, in one instance of the present invention, when a disk block is read, a checksum for that block can be in pageable or non-pageable memory. If it is in non-pageable memory 514, then it is immediately accessible and is checked immediately. If the checksum is in pageable memory, then it may or may not be in physical memory 512. If it is in physical memory 512 then it can also be checked immediately; but if it is paged out, then the data verifier component 502 cannot access it immediately, because doing so can trigger a paging request and an unsupported reentrancy into a lower portion of a disk driver stack.

Figure 6:
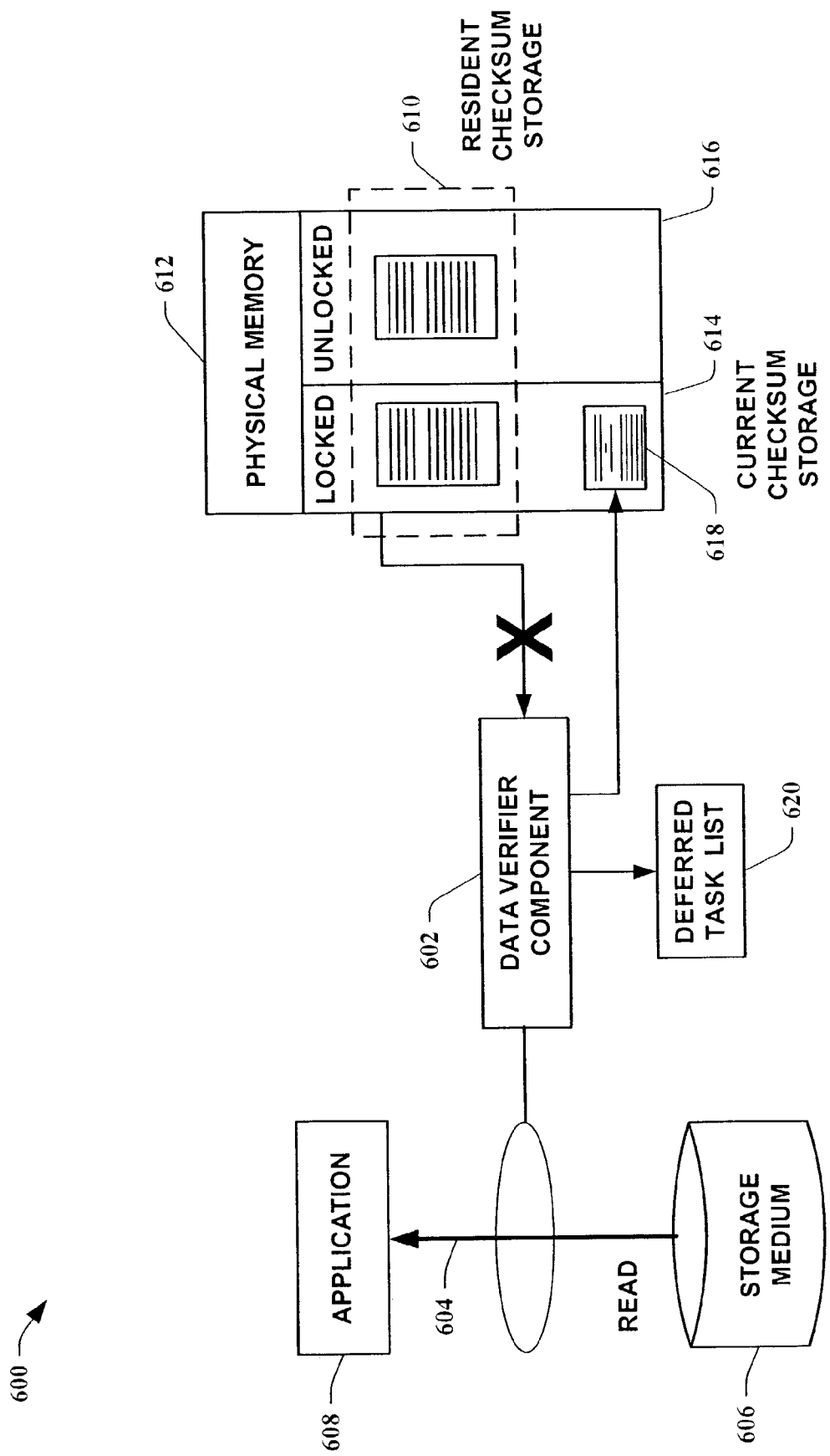
FIG. 6 is another block diagram of a data verification system with regard to a data read in accordance with an aspect of the present invention.

In FIG. 6, another block diagram of a data verification system 600 with regard to a data read in accordance with an aspect of the present invention is shown. The data verification system 600 is comprised of a data verifier component 602 which intercepts data during a read 604 between an application 608 and a storage medium 606. The data verifier component 602 checks the data's integrity by attempting to utilize "resident" verification information 610 such as checksums and the like stored in a system's physical memory 612. The resident verification information 610 is comprised of data stored in non-pageable memory 614 and/or pageable pool memory 616 residing on the system's physical memory 612. If stored verification information relating to data from the read 604 is not found in the resident verification information 610, the data verifier component 602 marks a task associated with verifying the data as "deferred" and tracks it in a deferred task list 620. The deferred task list 620 can be any means utilized to track a need to verify data such as a work item list and the like. The computed verification information is stored in non-pageable memory 614 as illustrated in FIG. 6 as a block 618 of non-pageable memory 614.

Figure 7:
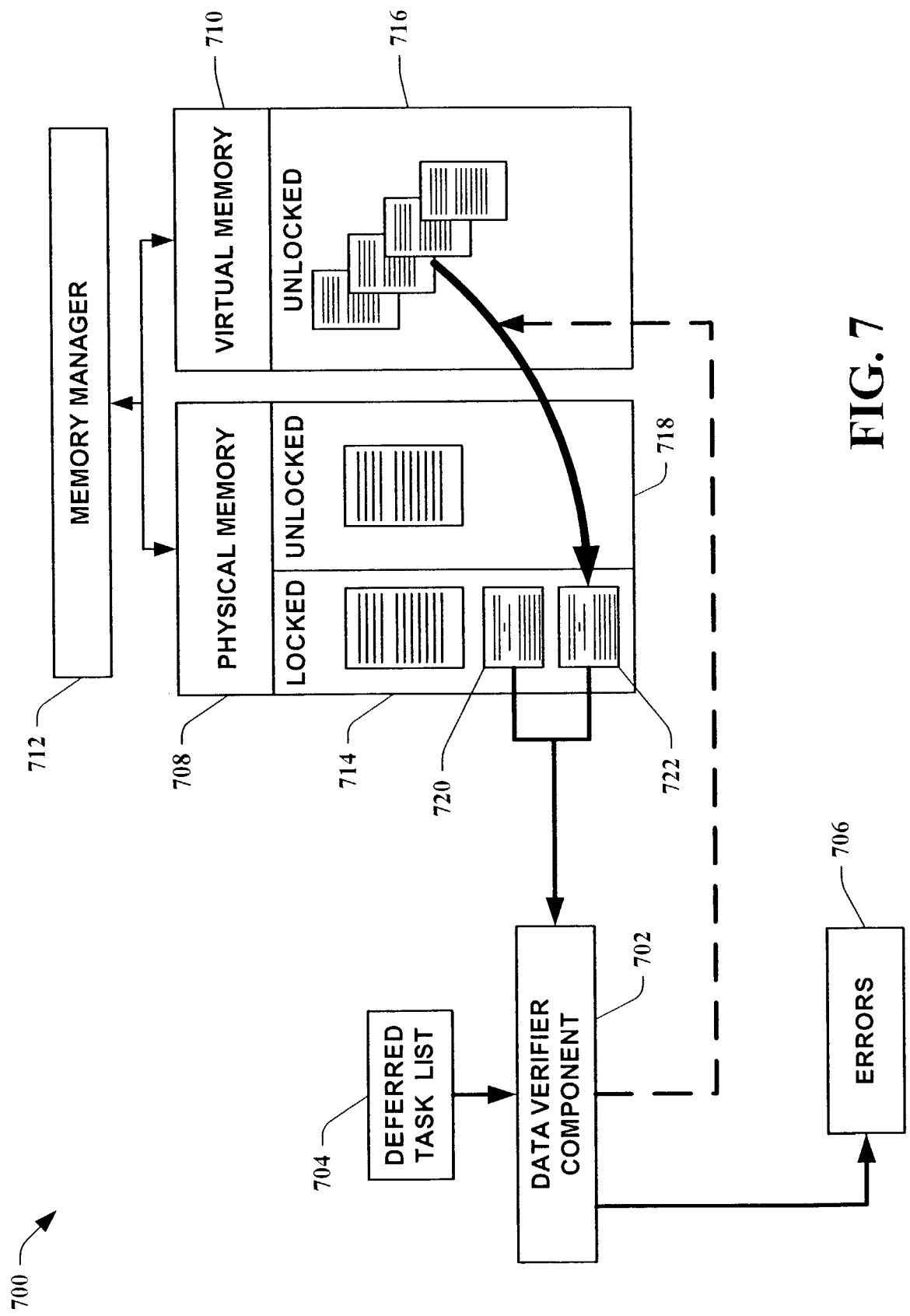
FIG. 7 is yet another block diagram of a data verification system with regard to a data read in accordance with an aspect of the present invention.

Turning to FIG. 7, yet another block diagram of a data verification system 700 with regard to a data read in accordance with an aspect of the present invention is depicted. The data verification system 700 is comprised of a data verifier component 702 which interfaces directly and/or indirectly with physical 708 and virtual memory 710 which are controlled by a memory manager 712. The physical memory 708 is comprised of non-pageable memory 714 and pageable pool memory 718. In this instance of the present invention, a read, as described above and relating to FIG. 6, has occurred while verification information required to verify the read is stored in virtual memory 710 as paged memory 716. The data verifier component 702 has previously stored computed verification information 720 relating to the read in non-pageable memory 714. When time allows, the data verifier component 702 processes a deferred task list 704 and begins to resolve verification tasks. In this example, the data verifier component 702 directly and/or indirectly (e.g., via the memory manager 712) moves required stored verification information 722 from the virtual memory 710 (paged memory 716) to non-pageable memory 714. The component 702 then compares the computed verification information 720 with the stored verification information 722 to verify the read retroactively. If the computed verification information 720 does not match the stored verification information 722, the data verifier component 702 outputs an error 706 such as an error report and/or bug check and the like.

For example, in one instance of the present invention, if a checksum for a currently read disk block is paged out to a disk, the data verifier component 702 allocates a small 'DeferredChecksum' context as non-pageable memory, into which it stores the checksum of data from the disk block that was just read as well as other information related to a request. It then queues a 'WorkItem' (a type of deferred procedure call in kernel-mode operating systems), passing the DeferredChecksum context to a WorkItem callback function. The WorkItem callback function then retroactively pages in a stored checksum and verifies a computed checksum against the stored checksum. The DeferredChecksum contexts are queued and processed in chronological order so that subsequent I/O to the disk block does not invalidate the stored checksum before the retroactive WorkItem can access it. Therefore, the DeferredChecksum/WorkItem callback function validates disk block transfers retroactively against a disk's correct state at the time that transfers occurred.

Figure 8:
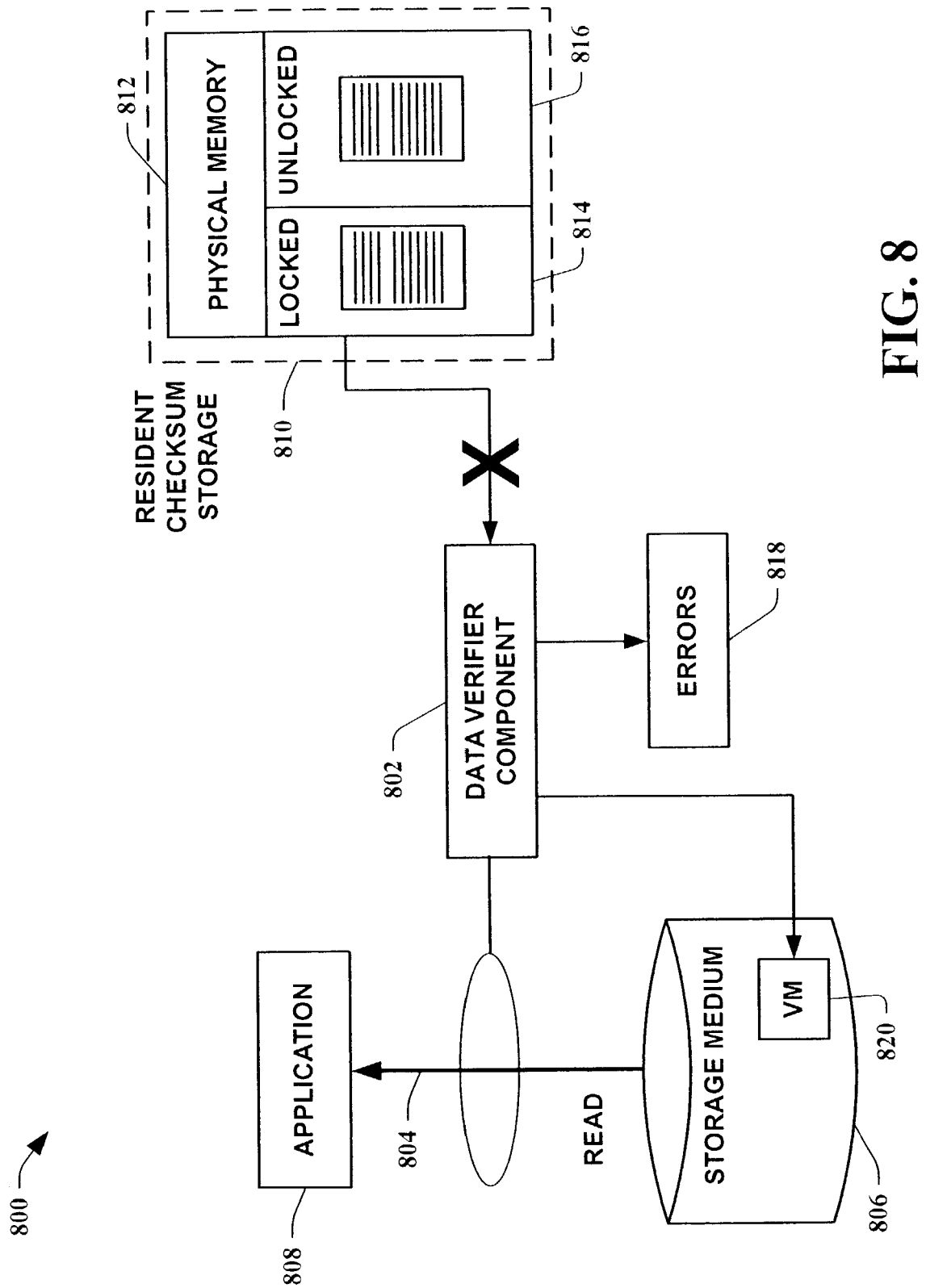
FIG. 8 is still yet another block diagram of a data verification system with regard to a data read in accordance with an aspect of the present invention.

Referring to FIG. 8, still yet another block diagram of a data verification system 800 with regard to a data read in accordance with an aspect of the present invention is shown. The data verification system 800 is comprised of a data verifier component 802 which intercepts data during a read 804 between an application 808 and a storage medium 806. Verification information is then computed from the read to facilitate in data integrity. The data verifier component 802 checks the data's integrity by attempting to utilize "resident" verification information 810 such as checksums and the like stored in a system's physical memory 812. The resident verification information 810 is comprised of data stored in non-pageable memory 814 and/or pageable pool memory 816 residing on the system's physical memory 812. If stored verification information relating to data from the read 804 is not found in the resident verification information 810, the data verifier component 802 accesses paged verification information files in a virtual memory space 820 on the storage medium 806. If computed verification information relating to the data from the read 804 does not match its verification information stored in the virtual memory space 820, the data verifier component 802 outputs an error 818 such as an error report and/or bug check and the like. This allows data to be checked, without utilizing a memory manager, synchronously regardless of whether or not verification information related to the data is resident in physical memory. In other instances of the present invention, the virtual memory space 820 resides on a different storage medium than the storage medium 806 from which data is being read.

Figure 9:
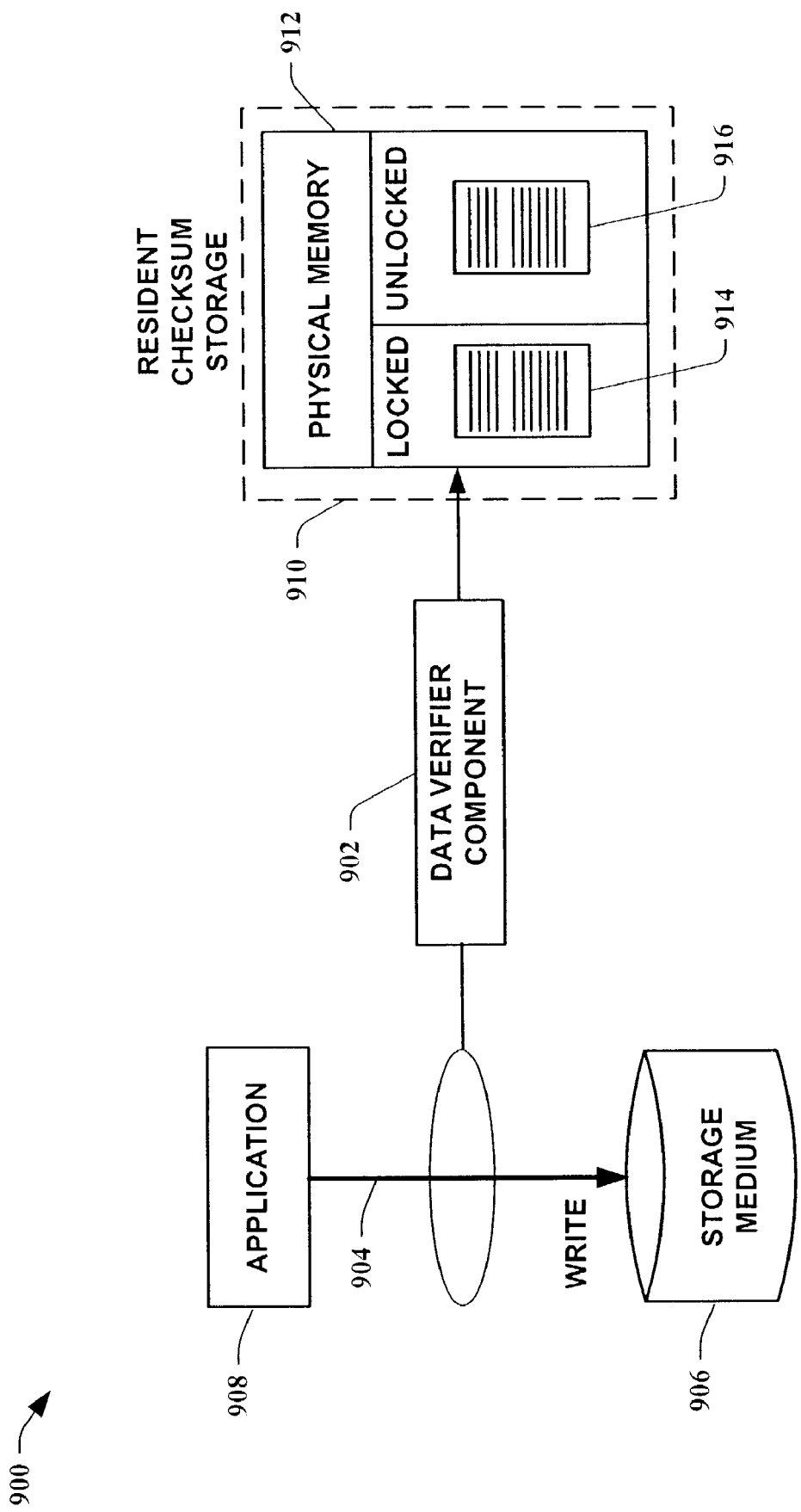
FIG. 9 is a block diagram of a data verification system with regard to a data write in accordance with an aspect of the present invention.

Similar operations occur for writes as well. Looking at FIG. 9, a block diagram of a data verification system 900 with regard to a data write in accordance with an aspect of the present invention is illustrated. The data verification system 900 is comprised of a data verifier component 902 which intercepts data during a write 904 between an application 908 and a storage medium 906. The data verifier component 902 updates the data's integrity information by accessing "resident" verification information 910 such as checksums and the like stored in a system's physical memory 912. The resident verification information 910 is comprised of data stored in non-pageable memory 914 and/or pageable pool memory 916 residing on the system's physical memory 912. Verification information relating to data from the write 904 is computed and is used to update the resident verification information 910.

Figure 10:
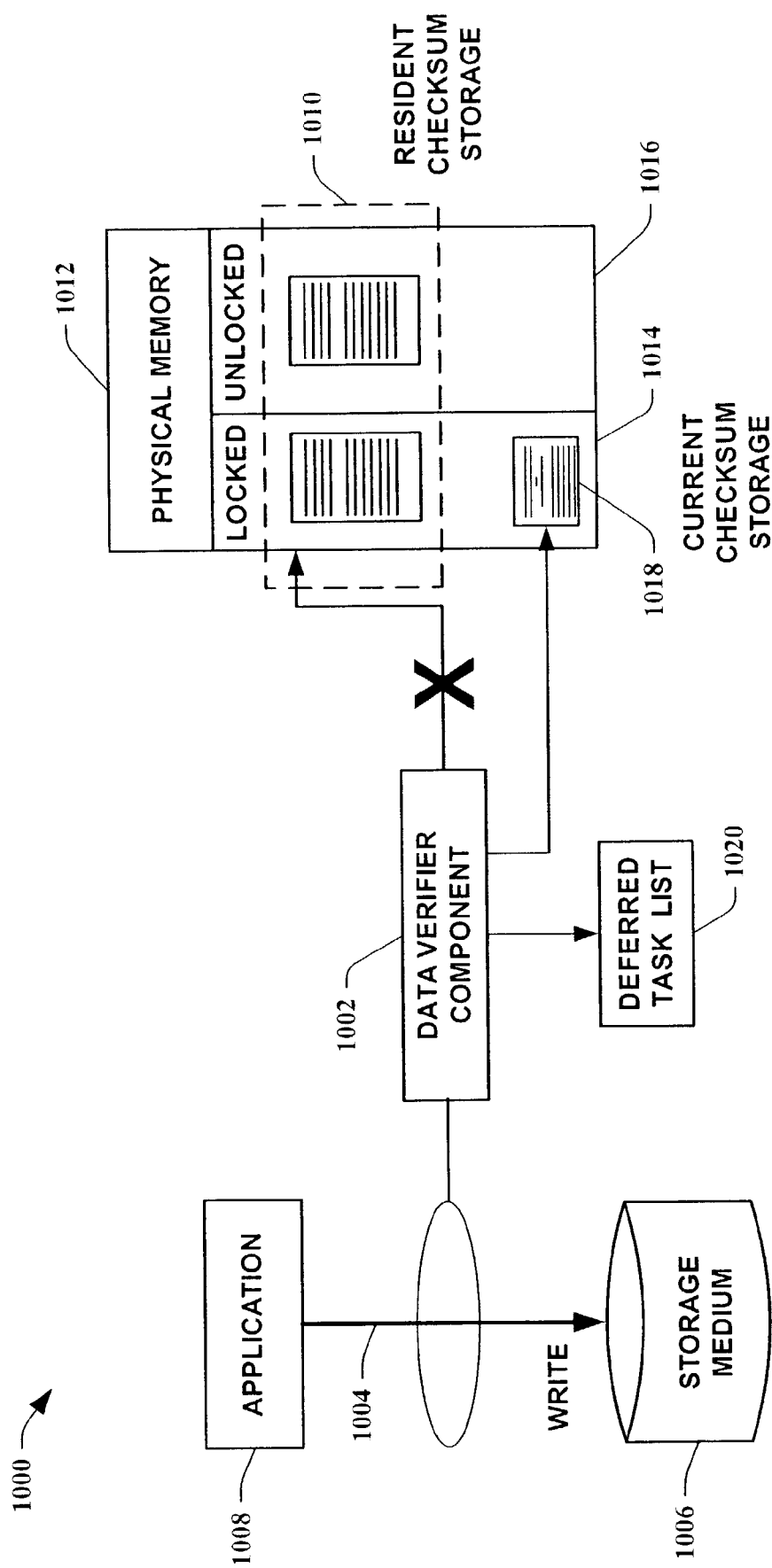
FIG. 10 is another block diagram of a data verification system with regard to a data write in accordance with an aspect of the present invention.

However, not all verification information that needs to be updated may be in a system's physical memory. In FIG. 10, another block diagram of a data verification system 1000 with regard to a data write in accordance with an aspect of the present invention is illustrated. The data verification system 1000 is comprised of a data verifier component 1002 which intercepts data during a write 1004 between an application 1008 and a storage medium 1006. The data verifier component 1002 updates the data's integrity information by attempting to access "resident" verification information 1010 such as checksums and the like stored in a system's physical memory 1012. The resident verification information 1010 is comprised of data stored in non-pageable memory 1014 and/or pageable pool memory 1016 residing on the system's physical memory 1012. If stored verification information relating to data from the write 1004 is not found in the resident verification information 1010, the data verifier component 1002 marks a task associated with updating the data as "deferred" and tracks it in a deferred task list 1020. The deferred task list 1020 can be any means utilized to track a need to update data such as a work item list and the like. The computed verification information is stored in non-pageable memory 1014 as illustrated in FIG. 10 as a block 1018 of non-pageable memory 1014.

Figure 11:
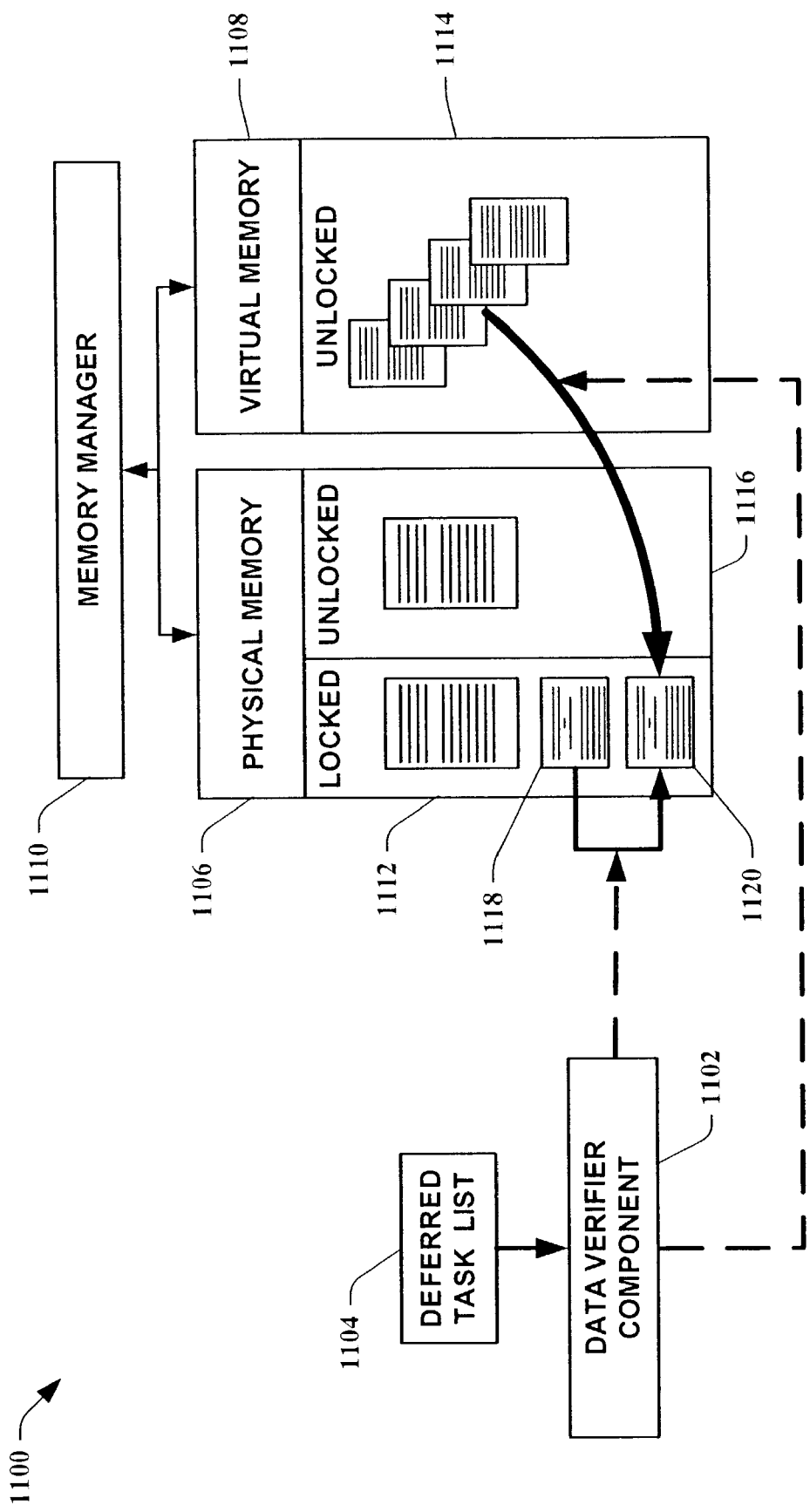
FIG. 11 is yet another block diagram of a data verification system with regard to a data write in accordance with an aspect of the present invention.

Referring to FIG. 11, yet another block diagram of a data verification system 1100 with regard to a data write in accordance with an aspect of the present invention is illustrated. The data verification system 1100 is comprised of a data verifier component 1102 which interfaces directly and/or indirectly with physical 1106 and virtual memory 1108 which are controlled by a memory manager 1110. The physical memory 1106 is comprised of non-pageable memory 1112 and pageable pool memory 1116. In this instance of the present invention, a write, as described above and relating to FIG. 10, has occurred while verification information required to be updated for the write is stored in virtual memory 1108 as paged memory 1114. The data verifier component 1102 has previously stored computed verification information 1118 relating to the write in non-pageable memory 1112. When time allows, the data verifier component 1102 processes a deferred task list 1104 and begins to resolve verification tasks. In this example, the data verifier component 1102 directly and/or indirectly (e.g., via the memory manager 1110) moves required stored verification information 1120 from the virtual memory 1108 (paged memory 1114) to non-pageable memory 1112. The component 1102 then updates the stored verification information 1120 with the computed verification information 1118 to update the write retroactively.

Figure 12:
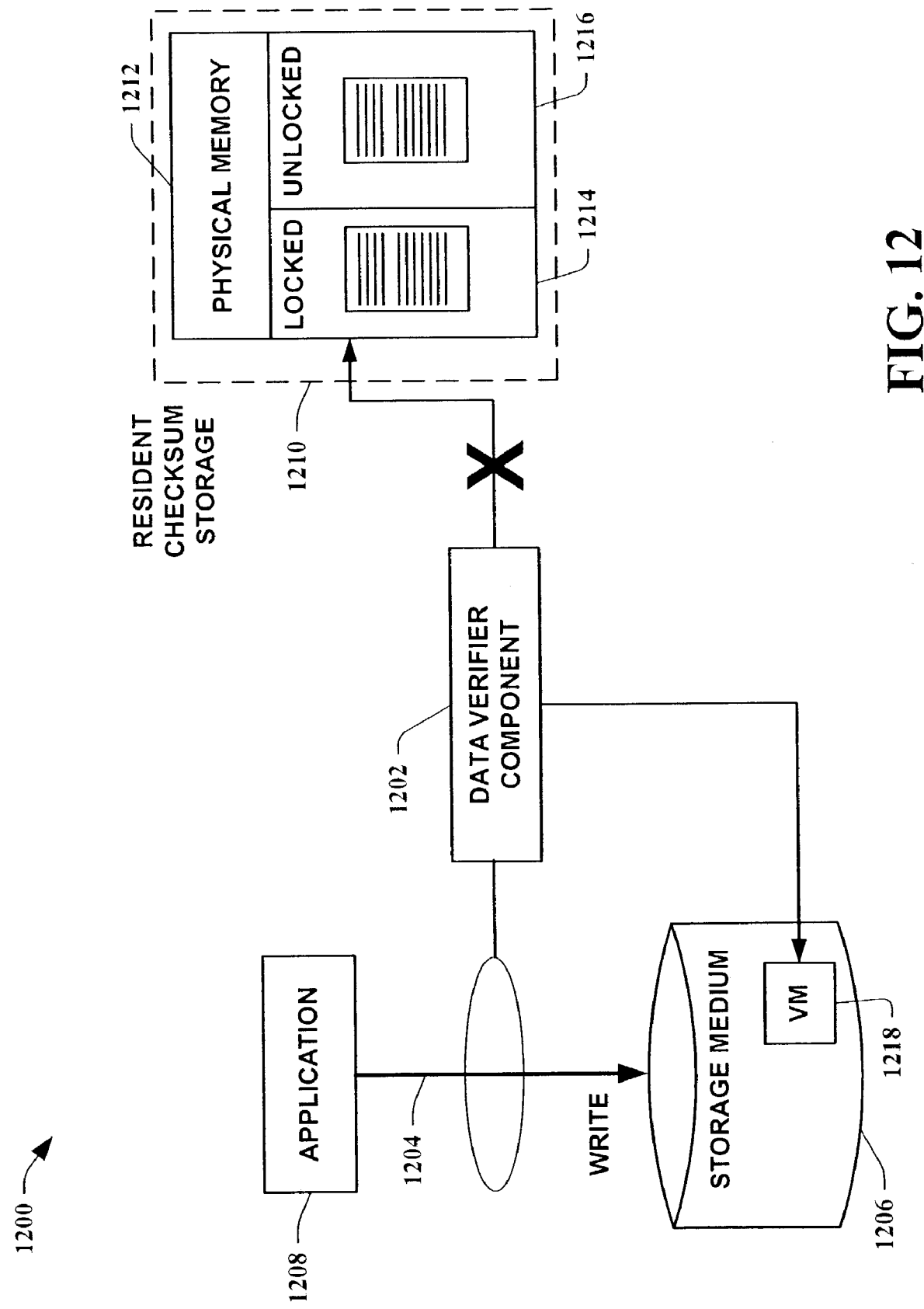
FIG. 12 is still yet another block diagram of a data verification system with regard to a data write in accordance with an aspect of the present invention.

Turning to FIG. 12, still yet another block diagram of a data verification system 1200 with regard to a data write in accordance with an aspect of the present invention is illustrated. The data verification system 1200 is comprised of a data verifier component 1202 which intercepts data during a write 1204 between an application 1208 and a storage medium 1206. Verification information is then computed from the write to facilitate in data integrity. The data verifier component 1202 checks the data's integrity by attempting to utilize "resident" verification information 1210 such as checksums and the like stored in a system's physical memory 1212. The resident verification information 1210 is comprised of data stored in non-pageable memory 1214 and/or pageable pool memory 1216 residing on the system's physical memory 1212. If stored verification information relating to data from the write 1204 is lot found in the resident verification information 1210, the data verifier component 1202 accesses paged verification information files in a virtual memory space 1218 on the storage medium 1206. This allows data to be checked, without utilizing a memory manager, synchronously regardless of whether or not verification information related to the data is resident in physical memory. In other instances of the present invention, the virtual memory space 1218 resides on a different storage medium than the storage medium 1206 to which data is being written.

In view of the exemplary systems shown and described above, methodologies that may be implemented in accordance with the present invention will be better appreciated with reference to the flow charts of FIGS. 13–17. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Figure 13:
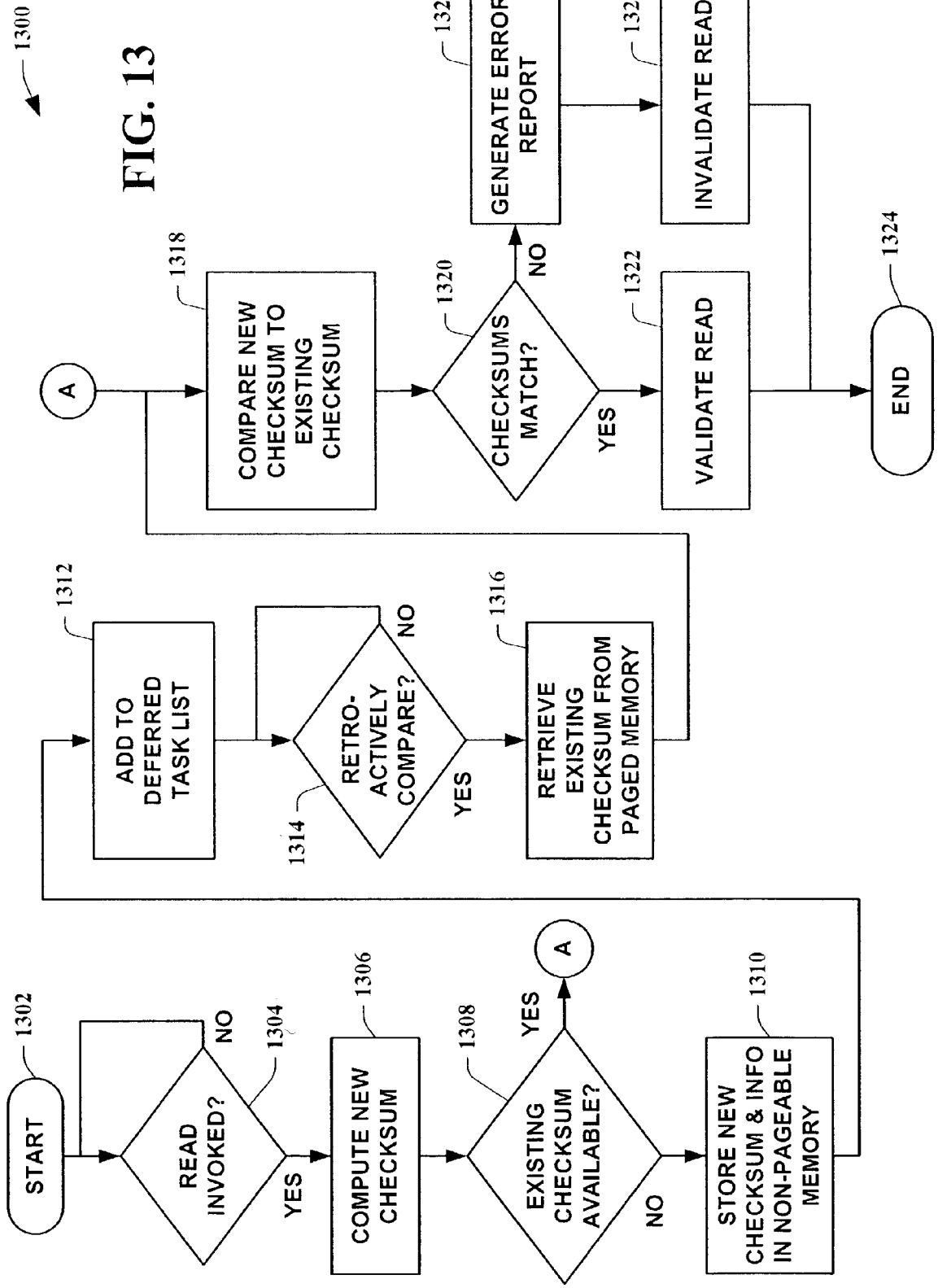
FIG. 13 is a flow diagram of a method of verifying stored data initiated by a data read in accordance with an aspect of the present invention.

In FIG. 13, a flow diagram of a method 1300 of verifying stored data initiated by a data read in accordance with an aspect of the present invention is depicted. The method 1300 starts 1302 by determining if a read has been invoked with regard to data stored on a storage medium 1304. If not, monitoring continues for determining if a read has been invoked. However, if a read has been invoked, new verification information such as a checksum is computed on the requested read data 1306. A determination is then made as to whether existing or prior verification information is resident in a system's physical memory (e.g., RAM) 1308. This can include checks in non-pageable memory along with checks into pageable pool memory residing on the system's physical memory. If prior verification information is not resident, the computed verification information is stored, along with related information such as a time stamp and the like, into non-pageable memory on the system's physical memory 1310. A task to complete this data verification is then entered and queued into a "deferred task list" such as a work list and the like 1312. A determination is then made as to whether it is time to retroactively compare the computed verification information with prior verification information not resident in the system's physical memory 1314. If not, monitoring continues until a correct time is reached. However, if it is appropriate, the existing or prior verification information is retrieved from a pagefile in paged memory stored in a virtual memory space on a storage medium 1316. The computed verification information is then compared to the existing or prior verification information 1318. A determination is then made as to whether the computed and existing verification information matches 1320. If the verification information matches, the data from the read is validated 1322 and the flow ends 1324. If, however, the verification information check indicates a mismatch, an error report or bug check is generated 1326 and the data from the read is invalidated 1328, ending the flow 1324.

If existing verification information is found during the determination to find existing verification information resident in a system's physical memory 308, the computed verification information is then compared to the existing or prior verification information 1318. A determination is then made as to whether the computed and existing verification information matches 1320. If the verification information matches, the data from the read is validated 1322 and the flow ends 1324. If, however, the verification information check indicates a mismatch, an error report or bug check is generated 1326 and the data from the read is invalidated 1328, ending the flow 1324.

Figure 14:
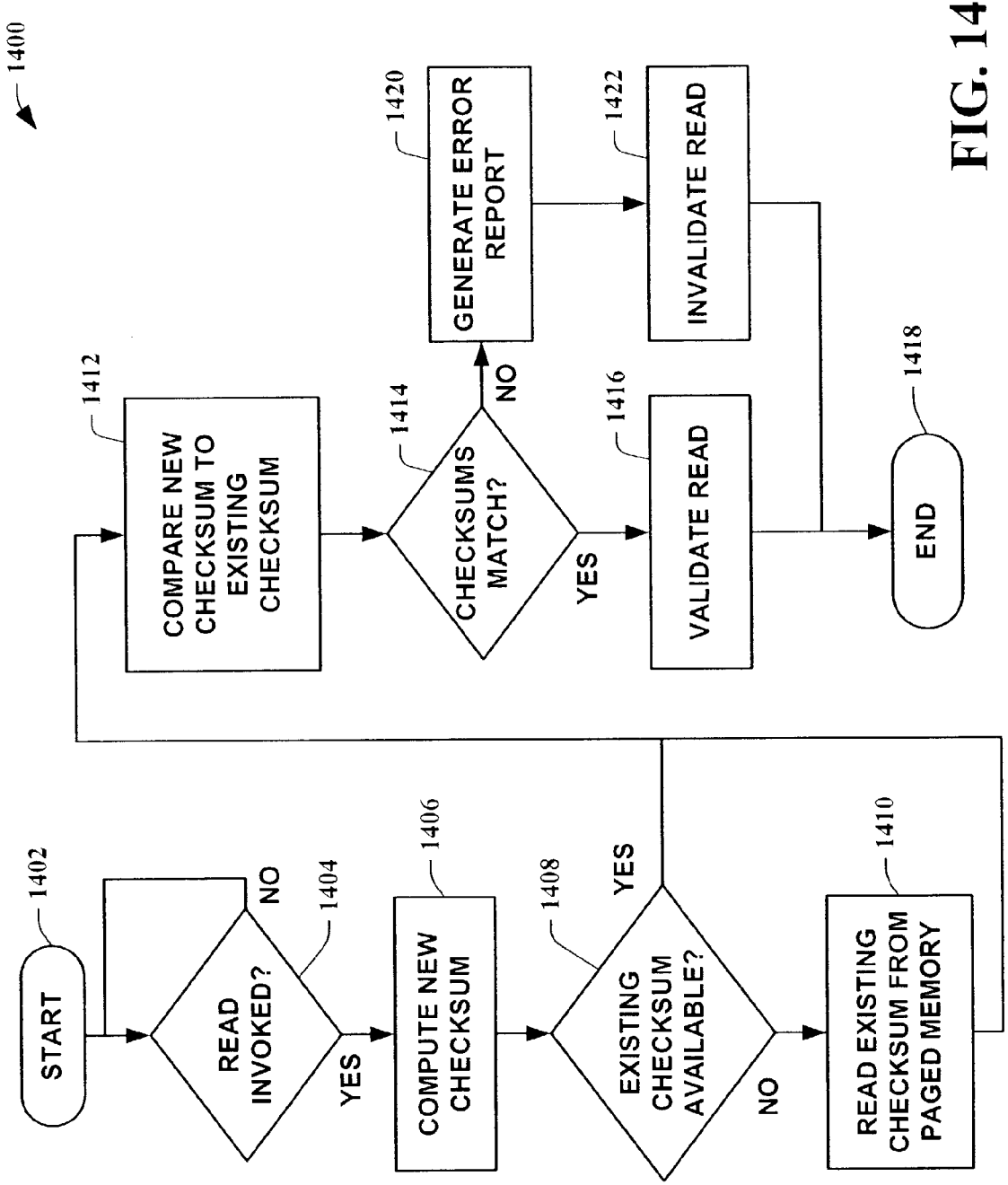
FIG. 14 is another flow diagram of a method of verifying stored data initiated by a data read in accordance with an aspect of the present invention.

Referring to FIG. 14, another flow diagram of a method 1400 of verifying stored data initiated by a data read in accordance with an aspect of the present invention is shown. The method 1400 starts 1402 by determining if a read has been invoked with regard to data stored on a storage medium 1404. If not, monitoring continues for determining if a read has been invoked. However, if a read has been invoked, new verification information such as a checksum is computed on the requested read data 1406. A determination is then made as to whether existing or prior verification information is resident in a system's physical memory (e.g., RAM) 1408. This can include checks in non-pageable memory along with checks into pageable pool memory residing on the system's physical memory. If prior verification information is not resident, the existing or prior verification information is read from paged memory located in a virtual memory space on a storage medium 1410. This negates a need to have a system's memory manager control access to the paged memory and allows for "on-the-fly" or synchronous integrity checks even when existing verification information is not stored in physical memory. The computed verification information is then compared to the existing or prior verification information 1412. A determination is then made as to whether the computed and existing verification information matches 1414. If the verification information matches, the data from the read is validated 1416 and the flow ends 1418. If, however, the verification information check indicates a mismatch, an error report or bug check is generated 1420 and the data from the read is invalidated 1422, ending the flow 1418.

If existing verification information is found during the determination to find existing verification information resident in a system's physical memory 1408, tile computed verification information is then compared to the existing or prior verification information 1412. A determination is then made as to whether the computed and existing verification information matches 1414. If the verification information matches, the data from the read is validated 1416 and the flow ends 1418. If, however, the verification information check indicates a mismatch, an error report or bug check is generated 1420 and the data from the read is invalidated 1422, ending the flow 1418.

Figure 15:
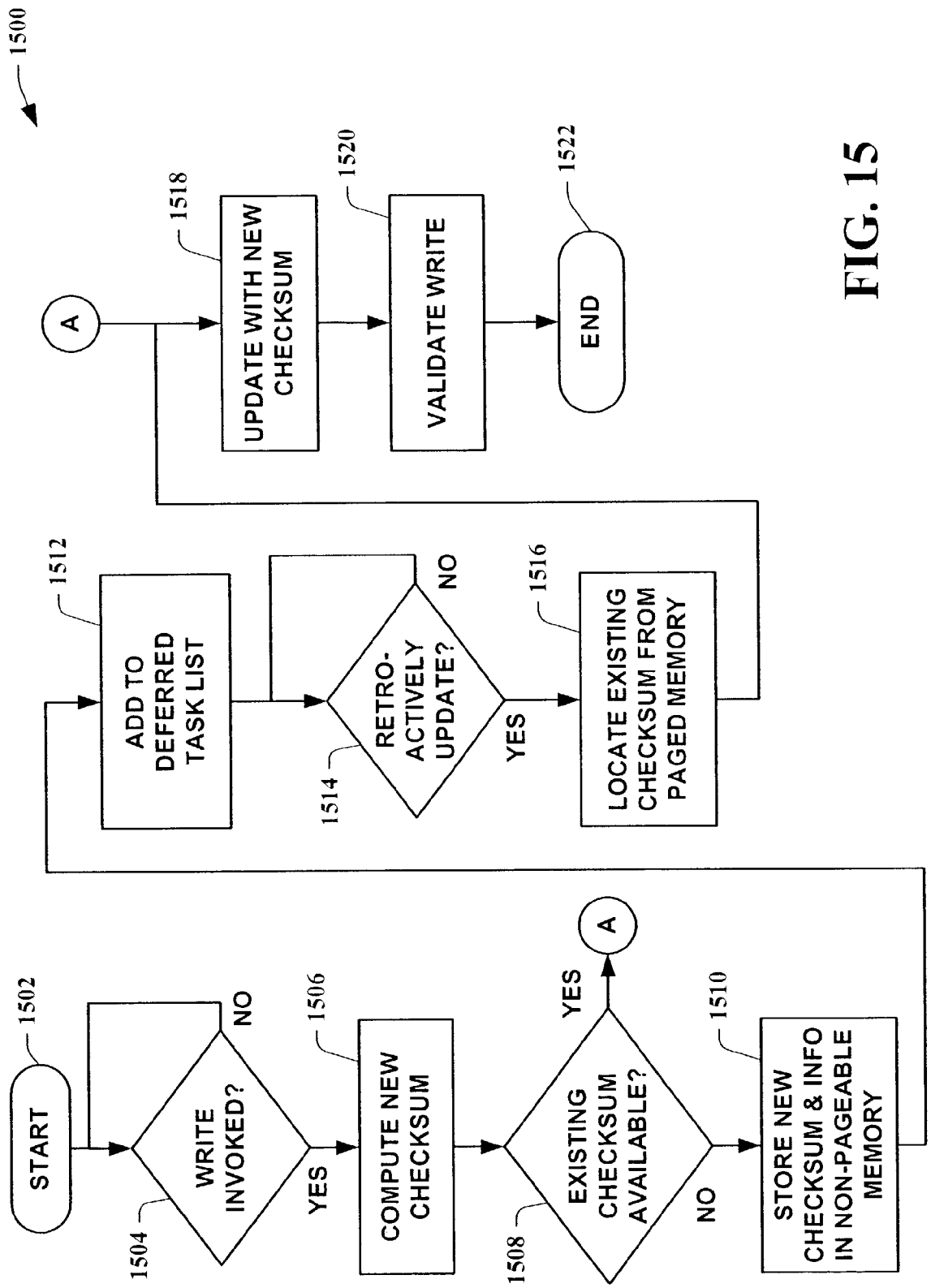
FIG. 15 is a flow diagram of a method of verifying stored data initiated by a data write in accordance with an aspect of the present invention.

Turning to FIG. 15, a flow diagram of a method 1500 of verifying stored data initiated by a data write in accordance with an aspect of the present invention is illustrated. The method 1500 starts 1502 by determining if a write has been invoked with regard to storing data on a storage medium 1504. If not, monitoring continues for determining if a write has been invoked. However, if a write has been invoked, new verification information such as a checksum is computed on the write data 1506. A determination is then made as to whether existing or prior verification information is resident in a system's physical memory (e.g., RAM) 1508. This can include checks in non-pageable memory along with checks into pageable pool memory residing on the system's physical memory. If prior verification information is not resident, the computed verification information is stored, along with related information such as a time stamp and the like, into non-pageable memory on the system's physical memory 1510. A task to complete this data update is then entered and queued into a "deferred task list" such as a work list and the like 1512. A determination is then made as to whether it is time to retroactively update the existing verification information not resident in the system's physical memory with the computed verification information now resident in the system's physical memory 1514. If not, monitoring continues until a correct time is reached. However, if it is appropriate, the existing or prior verification information is located in paged memory stored in a virtual memory space on a storage medium 1516. The existing verification information is then updated with the computed verification information 1518 and the data from the write is validated 1520, ending the flow 1522. However, if existing verification information is found during the determination to find existing verification information resident in a system's physical memory 1508, the existing verification information is then updated with the computed verification information 1518 and the data from the write is validated 1520, ending the flow 1522.

Figure 16:
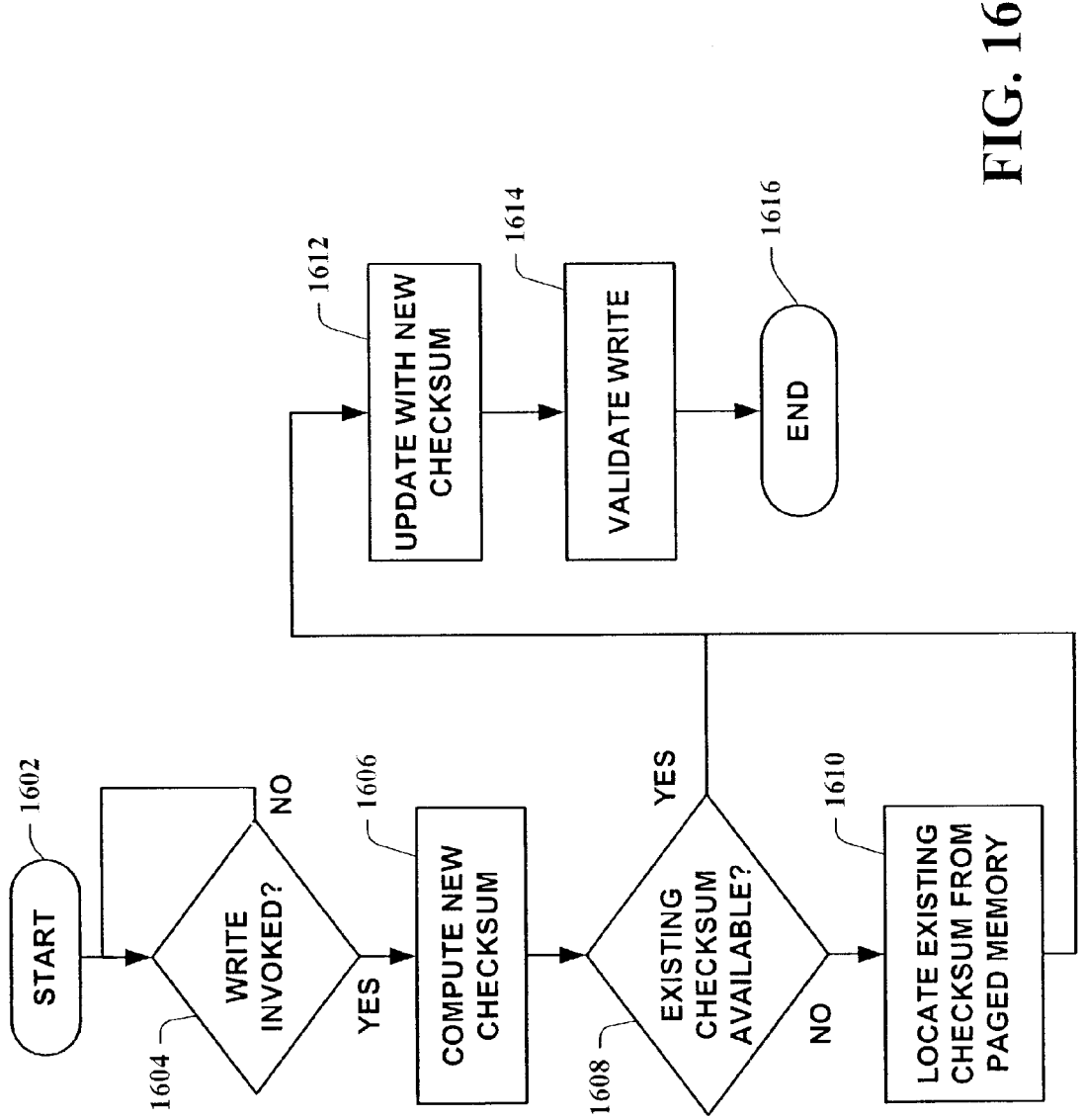
FIG. 16 is another flow diagram of a method of verifying stored data initiated by a data write in accordance with an aspect of the present invention.

In FIG. 16, another flow diagram of a method 1600 of verifying stored data initiated by a data write in accordance with an aspect of the present invention is depicted. The method 1600 starts 1602 by determining if a write has been invoked with regard to storing data on a storage medium 1604. If not, monitoring continues for determining if a write has been invoked. However, if a write has been invoked, new verification information such as a checksum is computed on the write data 1606. A determination is then made as to whether existing or prior verification information is resident in a system's physical memory (e.g., RAM) 1608. This can include checks in non-pageable memory along with checks into pageable pool memory residing on the system's physical memory. If prior verification information is not resident, the existing or prior verification information is located in paged verification information memory residing in a virtual memory space on a storage medium 1610. This negates a need to have a system's memory manager control access to the paged verification information memory and allows for "on-the-fly" or synchronous integrity information updates even when existing verification information is not stored in physical memory. The existing verification information is then updated with the computed verification information 1612 and the data from the write is validated 1614, ending the flow 1616. However, if existing verification information is found during the determination to find existing verification information resident in a system's physical memory 1608, the existing verification information is then updated with the computed verification information 1612 and the data from the write is validated 1614, ending the flow 1616.

Figure 17:
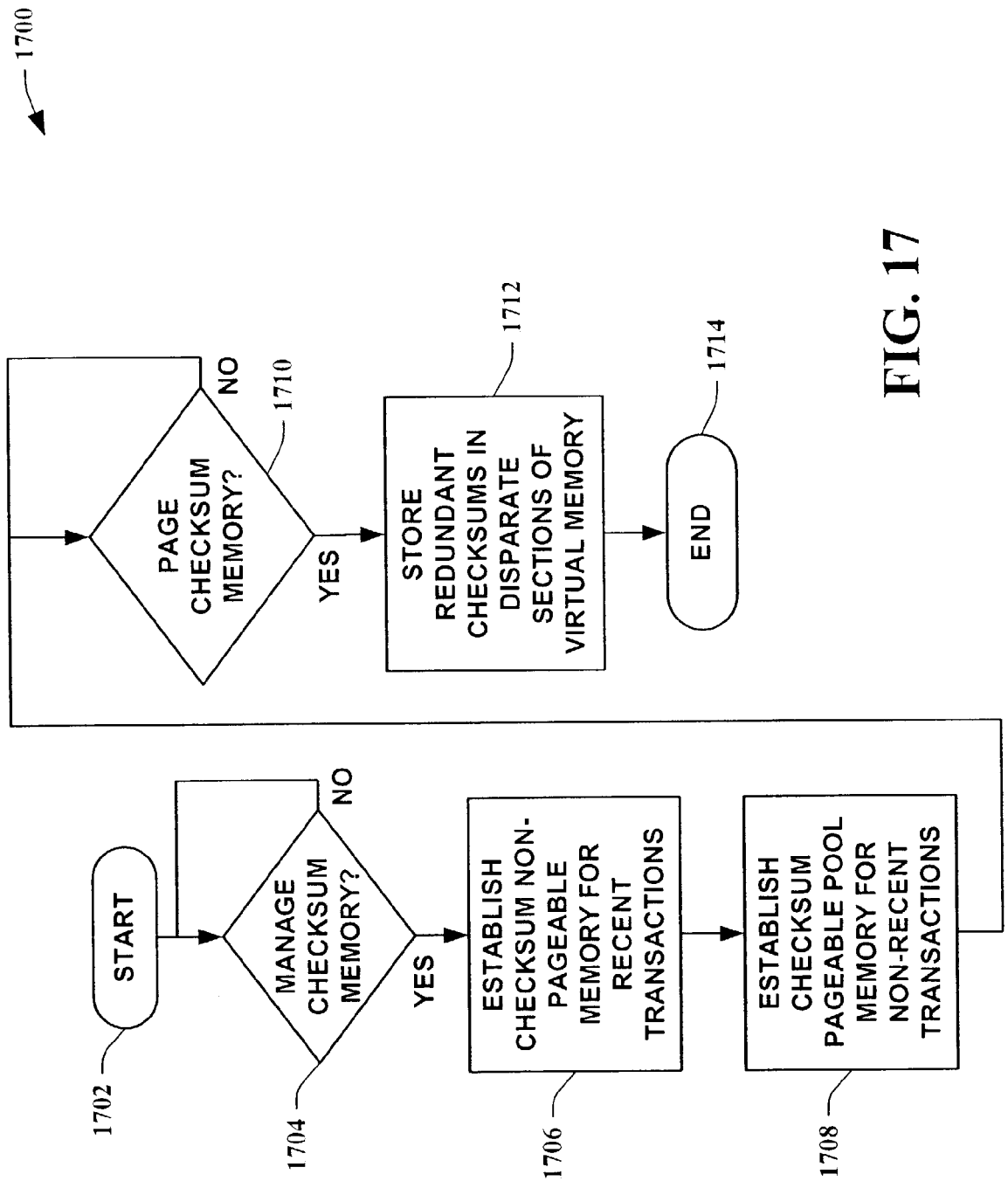
FIG. 17 is a flow diagram of a method of managing verification information memory in accordance with an aspect of the present invention.

Turning to FIG. 17, a flow diagram of a method 1700 of managing verification information memory in accordance with an aspect of the present invention is shown. The method 1700 starts 1702 with a determination as to whether verification information stored in memory is required to be managed 1704. If not, monitoring continues until the verification information memory is required to be managed. However, if the memory is to be managed, a non-pageable memory allocation is made to contain verification information for recent data integrity check transactions 1706. In an example of one instance of the present invention, a 4 megabyte allocation size is utilized for verification information for recent transactions. An allocation is then made for pageable pool memory for non-recent data integrity check transactions 1708. Since this memory is pageable, overflow from this allocation can be paged into a pagefile and stored in a virtual memory space. The virtual memory space can even reside on a storage medium being utilized to store data that is being monitored for integrity. A determination is then made as to whether there is sufficient overflow of the pageable pool memory to warrant paging the overflow pageable pool memory into a pagefile 1710. If not, monitoring of the pageable pool memory for overflow conditions continues. However, if it has been determined to page the pageable pool memory overflow, at least two redundant copies of the paged verification information is stored in disparate sections of a virtual memory space on a storage medium 1712, ending the flow 1714. The disparate sections include, but are not limited to, sections of virtual memory space that are in differing blocks of data on a storage medium and the like. One skilled in the art can appreciate that redundant copies are not required in order to fall within the scope of the present invention. However, the integrity of the stored pagefiles will not be easily verified with only a single stored pagefile.

Figure 18:
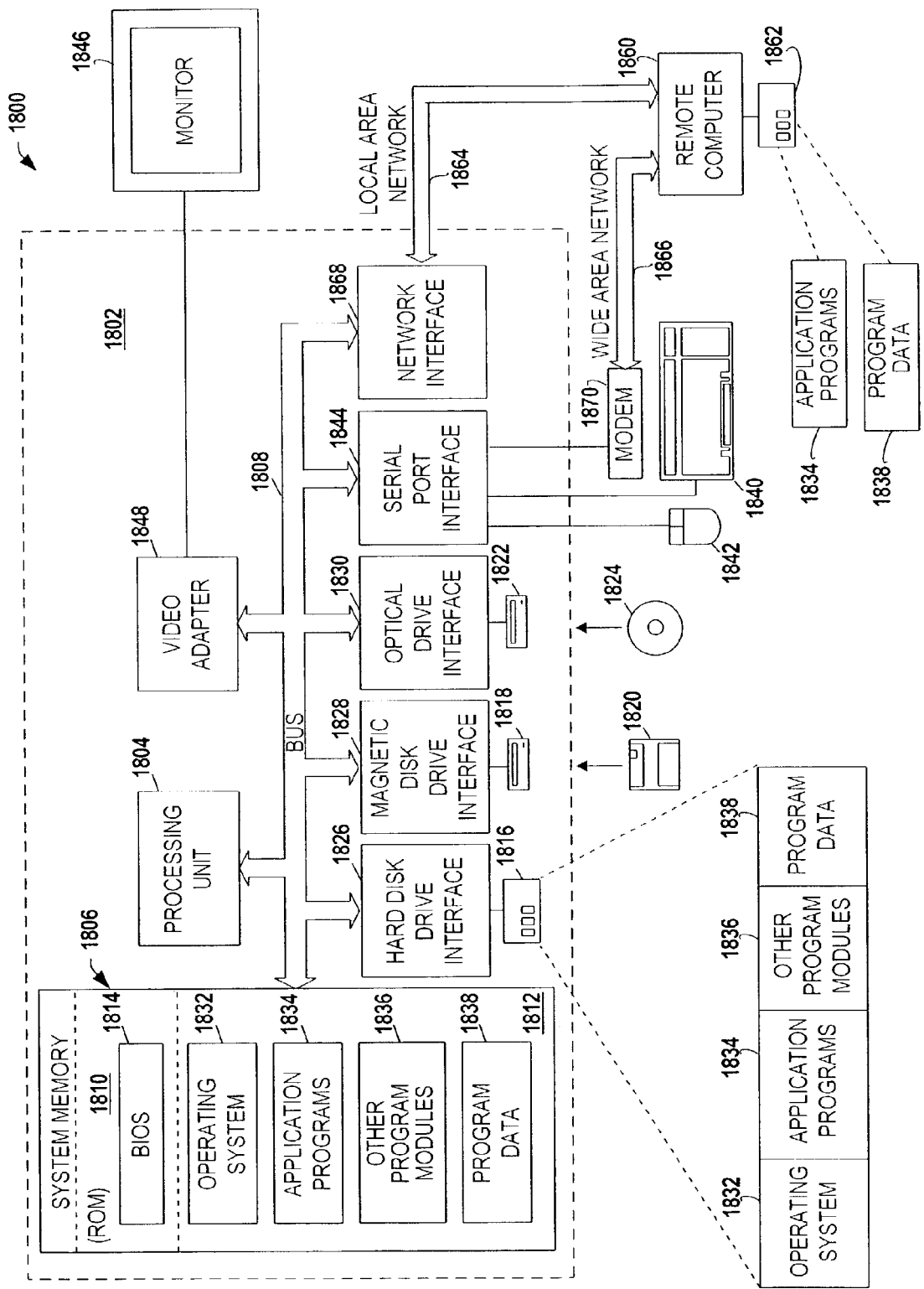
FIG. 18 illustrates an example operating environment in which the present invention can function.

In order to provide additional context for implementing various aspects of the present invention, FIG. 18 and the following discussion is intended to provide a brief, general description of a suitable computing environment 1800 in which the various aspects of the present invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that arc linked through a communications network. However, some, if not all, aspects of the invention may be practiced on stand-alone computers. In a distributed computing environment, program modules may be located in local and/or remote memory storage devices.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component. In addition, a component may include one or more subcomponents.

With reference to FIG. 18, an exemplary system environment 1800 for implementing the various aspects of the invention includes a conventional computer 1802, including a processing unit 1804, a system memory 1806, and a system bus 1808 that couples various system components, including the system memory, to the processing unit 1804. The processing unit 1804 may be any commercially available or proprietary processor. In addition, the processing unit may be implemented as multi-processor formed of more than one processor, such as may be connected in parallel.

The system bus 1808 may be any of several types of bus structure including a memory bus or memory controller, a peripheral bus, and a local bus using any of a variety of conventional bus architectures such as PCI, VESA, Microchannel, ISA, and EISA, to name a few. The system memory 1806 includes read only memory (ROM) 1810 and random access memory (RAM) 1812. A basic input/output system (BIOS) 1814, containing the basic routines that help to transfer information between elements within the computer 1802, such as during start-up, is stored in ROM 1810.

The computer 1802 also may include, for example, a hard disk drive 1816, a magnetic disk drive 1818, e.g., to read from or write to a removable disk 1820, and an optical disk drive 1822, e.g., for reading from or writing to a CD-ROM disk 1824 or other optical media. The hard disk drive 1816, magnetic disk drive 1818, and optical disk drive 1822 are connected to the system bus 1808 by a hard disk drive interface 1826, a magnetic disk drive interface 1828, and an optical drive interface 1830, respectively. The drives 1816–1822 and their associated computer-readable media provide nonvolatile storage of data, data structures, computer-executable instructions, etc. for the computer 1802. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment 1800, and further that any such media may contain computer-executable instructions for performing the methods of the present invention.

A number of program modules may be stored in the drives 1816–1822 and RAM 1812, including an operating system 1832, one or more application programs 1834, other program modules 1836, and program data 1838. The operating system 1832 may be any suitable operating system or combination of operating systems. By way of example, the operating system 1832 can include a data verifier component that utilizes memory in accordance with an aspect of the present invention. Additionally, the operating system 1832 can include input data from hardware storage devices for interfacing with the data verifier component in accordance with an aspect of the present invention.

A user can enter commands and information into the computer 1802 through one or more user input devices, such as a keyboard 1840 and a pointing device (e.g., a mouse 1842). Other input devices (not shown) may include a microphone, a joystick, a game pad, a satellite dish, wireless remote, a scanner, or the like. These and other input devices are often connected to the processing unit 1804 through a serial port interface 1844 that is coupled to the system bus 1808, but may be connected by other interfaces, such as a parallel port, a game port or a universal serial bus (USB). A monitor 1846 or other type of display device is also connected to the system bus 1808 via an interface, such as a video adapter 1848. In addition to the monitor 1846, the computer 1802 may include other peripheral output devices (not shown), such as speakers, printers, etc.

It is to be appreciated that the computer 1802 can operate in a networked environment using logical connections to one or more remote computers 1860. The remote computer 1860 may be a workstation, a server computer, a router, a peer device or other common network node, and typically includes many or all of the elements described relative to the computer 1802, although, for purposes of brevity, only a memory storage device 1862 is illustrated in FIG. 18. The logical connections depicted in FIG. 18 can include a local area network (LAN) 1864 and a wide area network (WAN) 1866. Such networking environments are commonplace in offices, enterprise-wide computer networks, intranets and the Internet.

When used in a LAN networking environment, for example, the computer 1802 is connected to the local network 1864 through a network interface or adapter 1868. When used in a WAN networking environment, the computer 1802 typically includes a modem (e.g. telephone, DSL, cable, etc.) 1870, or is connected to a communications server on the LAN, or has other means for establishing communications over the WAN 1866, such as the Internet. The modem 1870, which can be internal or external relative to the computer 1802, is connected to the system bus 1808 via the serial port interface 1844. In a networked environment, program modules (including application programs 1834) and/or program data 1838 can be stored in the remote memory storage device 1862. It will be appreciated that the network connections shown are exemplary and other means (e.g., wired or wireless) of establishing a communications link between the computers 1802 and 1860 can be used when carrying out an aspect of the present invention.

In accordance with the practices of persons skilled in the art of computer programming, the present invention has been described with reference to acts and symbolic representations of operations that are preformed by a computer, such as the computer 1802 or remote computer 1860, unless otherwise indicated. Such acts and operations are sometimes referred to as being computer-executed. It will be appreciated that the acts and symbolically represented operations include the manipulation by the processing unit 1804 of electrical signals representing data bits which causes a resulting transformation or reduction of the electrical signal representation, and the maintenance of data bits at memory locations in the memory system (including the system memory 1806, hard drive 1816, floppy disks 1820, CD-ROM 1824, and remote memory 1862) to thereby reconfigure or otherwise alter the computer system's operation, as well as other processing of signals. The memory locations where such data bits are maintained are physical locations that have particular electrical, magnetic, or optical properties corresponding to the data bits.

Figure 19:
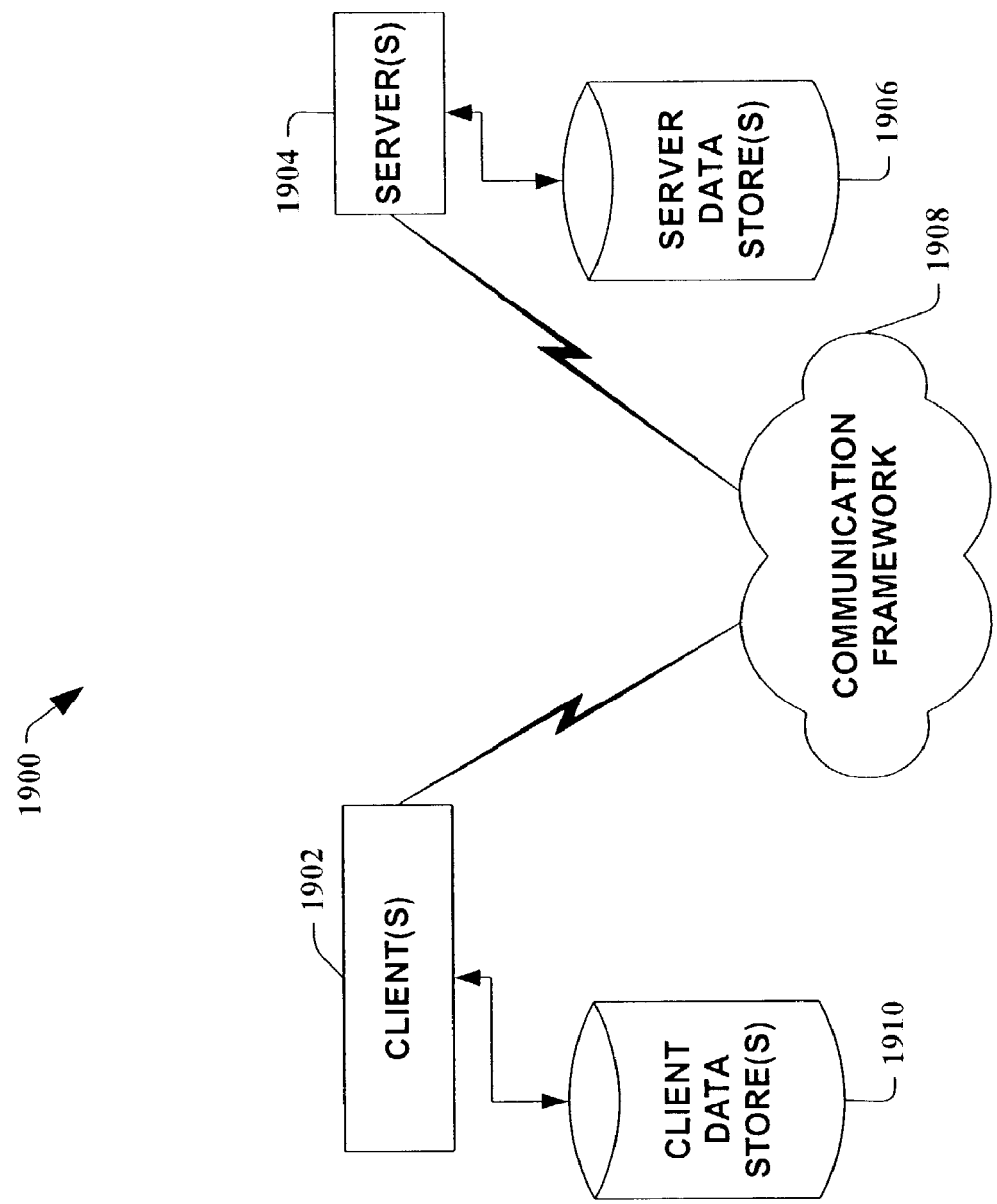
FIG. 19 illustrates another example operating environment in which the present invention can function.

FIG. 19 is another block diagram of a sample computing environment 1900 with which the present invention can interact. The system 1900 further illustrates a system that includes one or more client(s) 1902. The client(s) 1902 can be hardware and/or software (erg., threads, processes, computing devices). The system 1900 also includes one or more server(s) 1904. The server(s) 1904 can also be hardware and/or software (e.g., threads, processes, computing devices). The servers 1904 can house threads to perform transformations by employing the present invention, for example. One possible communication between a client 1902 and a server 1904 may be in the form of a data packet adapted to be transmitted between two or more computer processes. The system 1900 includes a communication framework 1908 that can be employed to facilitate communications between the client(s) 1902 and the server(s) 1904. The client(s) 1902 are operably connected to one or more client data store(s) 1910 that can be employed to store information local to the client(s) 1902. Similarly, the server(s) 1904 are operably connected to one or more server data store(s) 1906 that can be employed to store information local to the servers 1904.

In one instance of the present invention, a data packet is transmitted between two or more computer components that facilitates establishing validity of stored data, the data packet is comprised of, at least in part, verification information from a data verifier component that utilizes, at least in part, pageable pool memory to store verification information relating to data on a storage medium. In another instance of the present invention, the verification information in a data packet is comprised of a checksum array and/or a checksum array time stamp that indicates when the checksum array was computed.

In another instance of the present invention, a computer readable medium storing computer executable components of a system for facilitating validity of stored data is comprised of a data verifier component that utilizes, at least in part, pageable pool memory to store verification information relating to data on a storage medium.

It is to be appreciated that the apparatus, systems and/or methods of the present invention can be utilized in a data verification scheme for facilitating computer components and non-computer related components alike. Further, those skilled in the art will recognize that the apparatus, systems and/or methods of the present invention can be employed in a vast array of electronic related technologies, including, but not limited to, computers, servers and/or handheld electronic devices and the like.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates stored data integrity, comprising:
   a data verifier component that utilizes, at least in part, pageable pool memory to store verification information relating to data on a storage medium, the data verifier component utilized for at least one selected from the group consisting of comparing checksums for data read from the storage medium and updating checksums for data written to the storage medium.

2. The system of claim 1, the data verifier component verifying data relating to non-paged checksums synchronously with at least one selected from the group consisting of a data read and a data write.

3. The system of claim 1, the data verifier component verifying data relating to paged checksums retroactively, relative to a time occurrence of an event selected from the group consisting of a data read and a data write.

4. The system of claim 1, the data verifier component verifying data relating to paged checksums synchronously, relative to a time occurrence of an event selected from the group consisting of a data read and a data write.

5. The system of claim 1, the verification information comprising at least one checksum array.

6. The system of claim 5, the checksum array comprising a cyclic redundancy check (CRC) checksum array.

7. The system of claim 6, the CRC checksum array comprising a sequence of 2-byte checksums representing at least one 512-byte data block.

8. The system of claim 1, the verification information comprising, at least in part, at least one time stamp relating to a checksum.

9. The system of claim 1, the data verifier component storing a predetermined portion of most recently accessed checksums in non-pageable memory to facilitate rapid access thereof.

10. The system of claim 9, the predetermined portion comprising a 4 megabyte portion of non-pageable memory.

11. The system of claim 1, the data verifier component storing at least two copies of each checksum in disparate sections of a virtual memory space.

12. The system of claim 11, the data verifier component initiating an error when a mismatch of the two copies occurs.

13. The system of claim 1, the data verifier component interacting with a memory manager to establish a predetermined non-pageable pool memory size and to establish a redundant storage procedure for paged memory to allow an integrity check of the paged memory via a comparator means.

14. The system of claim 1, the data verifier initiating an error when the verification information indicates corrupt data.

15. A device employing the system of claim 1 comprising at least one from the group consisting of a computer, a server, and a handheld electronic device.

16. A method for verifying stored data, comprising:
computing verification information relating to stored data; and
utilizing verification information stored, at least in part, in pageable pool memory to validate the stored data by comparing the computed verification information to existing verification information to establish data validity when data is read from a storage medium.

17. The method of claim 16, the verification information comprising, at least in part, checksum arrays.

18. The method of claim 16, the verification information comprising, at least in part, checksum array time information.

19. The method of claim 16, further comprising:
updating existing verification information with the computed verification information when data is written to a storage medium.

20. The method of claim 16, further comprising:
paging overflow verification information from the pageable pool memory.

21. The method of claim 20, further comprising:
storing the paged overflow verification information in a virtual memory space.

22. The method of claim 21, storing including saving at least two redundant copies of the paged overflow verification information in disparate sections in the virtual memory space.

23. The method of claim 22, further comprising:
comparing the redundant copies of the paged overflow verification information to establish data validity before utilizing the paged overflow verification information to verify computed verification information.

24. The method of claim 16, further comprising:
determining if desired existing verification information is resident in paged memory; and
accessing the desired existing verification information when resident in the paged memory.

25. The method of claim 24, further comprising:
comparing the existing verification information to the paged existing verification information to determine data validity when reading data from a storage medium; and
updating the existing verification information with the computed verification information when writing data to a storage medium.

26. The method of claim 16, further comprising:
determining if desired existing verification information is resident in paged memory; and
appending a task to a deferred task list when the desired existing verification information is resident in the paged memory.

27. The method of claim 26, further comprising:
storing the computed verification information in non-pageable memory when the desired existing verification information is resident in the paged memory; and
performing, retroactively, tasks in the deferred task list when processing time is available.

28. The method of claim 27, performing tasks comprising:
locating the existing verification information in the paged memory;
comparing the existing verification information to the stored computed verification information to determine data validity when reading data from a storage medium; and
updating the existing verification information with the stored computed verification information when writing data to a storage medium.

29. The method of claim 27, performing, retroactively, the tasks from the deferred task list in a chronological order.

30. A device employing the method of claim 16 comprising at least one from the group consisting of a computer, a server, and a handheld electronic device.

31. A system for validating storage media data, comprising:
means for storing verification information about data on a storage medium, at least in part, in pageable pool memory; and
means for paging overflow verification information from the pageable pool memory to a virtual memory space.

32. The system of claim 31, further including:
means for computing verification information related to data on a storage medium;
means for comparing the computed verification information and the stored verification information to determine validity of data read from a storage medium; and
means for updating the stored verification information with the computed verification information when data is written to a storage medium.

33. The system of claim 31, further including:
means for storing at least two redundant copies of the paged overflow verification information in disparate sections of the virtual memory space; and means for comparing the redundant copies to determine data validity before the paged overflow verification information is utilized.

34. A method of saving verification data, comprising:
storing verification information utilized to validate data on a storage medium, at least in part, in pageable pool memory; and
storing recently accessed verification information in non-pageable memory.

35. The method of claim 34, further comprising:
storing overflow verification information from the pageable pool memory into paged memory.

36. The method of claim 35, storing including saving redundant copies of the overflow verification information in disparate sections of a virtual memory space.

37. A data packet transmitted between two or more computer components that facilitates establishing validity of stored data, the data packet comprising, at least in part, verification information from a data verifier component that utilizes, at least in part, pageable pool memory to store verification information relating to data on a storage medium, the data verifier component utilized for at least one selected from the group consisting of comparing checksums for data read from the storage medium and updating checksums for data written to the storage medium.

38. The data packet of claim 37, the verification information comprising at least one selected from the group consisting of a checksum array and a checksum array time stamp.

39. A computer readable medium storing computer executable components of a system for facilitating validity of stored data, comprising a data verifier component that utilizes, at least in part, pageable pool memory to store verification information relating to data on a storage medium, the data verifier component utilized for at least one selected from the group consisting of comparing checksums for data read from the storage medium and updating checksums for data written to the storage medium.

* * * * *